(12) United States Patent
Chung et al.

(10) Patent No.: US 6,359,871 B1
(45) Date of Patent: Mar. 19, 2002

(54) CELLULAR COMMUNICATIONS NETWORK

(75) Inventors: Kah-Seng Chung; Richard Beaumont Seale; David Antony Barker, all of Perth (AU)

(73) Assignee: Curtin University of Technology (AU)

( * ) Notice: Subject to any disclaimer, the term of this patent is extended or adjusted under 35 U.S.C. 154(b) by 0 days.

(21) Appl. No.: 08/737,963

(22) PCT Filed: May 29, 1995

(86) PCT No.: PCT/AU95/00313

§ 371 Date: Feb. 19, 1997

§ 102(e) Date: Feb. 19, 1997

(87) PCT Pub. No.: WO95/33346

PCT Pub. Date: Dec. 7, 1995

(30) Foreign Application Priority Data

May 27, 1994 (AU) ............................................. PM5936

(51) Int. Cl.[7] ................................................ H04Q 7/24
(52) U.S. Cl. ....................................... 370/338; 370/404
(58) Field of Search ................................ 370/328, 338, 370/310, 401, 452, 460, 336, 337, 347, 404, 350, 503

(56) References Cited

U.S. PATENT DOCUMENTS 5,285,443 A * 2/1994 Patsiokas et al. ............. 370/29
5,715,245 A * 2/1998 Sunovieri .................... 370/337

* cited by examiner

Primary Examiner—Jessica J. Harrison
Assistant Examiner—Kim T. Nguyen
(74) Attorney, Agent, or Firm—Schwegman, Lundberg, Woessner & Kluth, P.A.

(57) ABSTRACT

A communication network for an area such as an underground mine. A plurality of cascaded base stations (13) are serially interconnected in a ring structure (11) to form a network backbone. One of the base stations (13) at one end of the network backbone forms a network controller (15) for controlling the network. A plurality of portables (17) are adapted for communication with any of the base stations via a common air interface. A backbone network protocol (19) is provided for communicating between the network controller (15) and all of the base stations (13) and between the base stations (13) along the network backbone themselves. A common air interface protocol (21) is provided for communicating between a portable (17) and a base station (13). The other base stations (13) function as slaves relative to the network controller (15). Each slave base station (13) defines a discrete cell within which communication between a portable (17) disposed within a cell and the base station (13) generating the cell is able to be performed over the common air interface. A method of communicating using a startup procedure which assigns different operating carrier frequencies to each of the base stations for the common air interfaces of the cells therefor is also described.

51 Claims, 13 Drawing Sheets

CELLULAR COMMUNICATIONS NETWORK

TECHNICAL FIELD

This invention relates to a cellular communication network and method which has particular utility in underground mines, but also application in industry and localised open environs.

BACKGROUND ART

The underground mining industry has long recognised the importance of radio communications for enhancing productivity and safety. Experiments on radio transmission in underground mines date back to as early as the 1920s. Most of these early experiments were aimed at through-the-rock radio communication between the surface and underground mine personnel. However, past experience has indicated that through-the-rock radio transmission is too sensitive to rock composition for it to be considered reliable.

Starting at the end of the 1960s through to the 1970s, extensive experimental and theoretical investigations on electromagnetic propagation in underground tunnels were carried out in Europe and USA. These studies led to a good understanding of the complex mechanisms involved in radio propagation in underground mine, road and railway tunnels as well as the developments of leaky feeders and mode converters for improving radio propagation along tunnels. Radio systems employing leaky coaxial cables are still widely used in underground mines. However, these systems are usually restricted to supporting only one or two voice channels and remain expensive for continually extending the communication distance required in conjunction with the ongoing extension of the mine in a normal mining area application.

In recent years, the sophistication of mechanical equipment used in modern underground mines has grown rapidly with advanced technology but the progress in underground communications remains almost stagnant. In addition to voice communication, modern underground mines require data communication for remote monitoring and control of machinery. In these cases, data communication is usually achieved with a separate wired system operating independently from the radio system for voice communication.

In most underground mines, voice communication is achieved via either line telephone or radio systems based on low-frequency inductive loop or high-frequency leaky feeder techniques. In an attempt to improve communication quality, in recent times there has been a focus on VHF and UHF leaky coaxial cable systems. A drawback with these systems, however, is that the higher cable attenuations encountered at these high frequencies mean that signal amplifications by intermediate repeaters are needed at approximately every 500 m to 1500 m. It follows that a good understanding of the complex operating mechanisms of leaky coaxial cable is essential for achieving the required system performance. Furthermore, these leaky systems require rewiring for each advance of the active mining area.

For remote monitoring and control purposes, it is common to use a separate data transmission system based on metallic cables, such as twisted pairs and coaxial cable, or more recently optical fibre cable. Manually operated data loggers are sometimes employed for data acquisition in smaller mines.

These existing systems remain very restrictive in terms of communication capacity, mobility, voice quality and flexibility in system reconfiguration and extension. Despite the high investment in installing, maintaining and operating an array of incompatible systems, the performance achieved has been less than satisfactory. Therefore it is believed that a significant cost advantage can be achieved by adopting an integrated system capable of handling both voice and data.

Having regard to surface communication networks, in recent times the cellular concept of radio coverage has become well established in the wide area cellular telephone field. Moreover, applications involving smaller cell sizes for servicing local areas in offices, factories and residential areas are beginning to be introduced. An example is the advanced Digital European Cordless Telecommunications system (DECT). In this system, fixed radio base stations are suitably located to provide radio coverage for particular zones of the service area. Usually, each base station is linked by a cable to a central control hub in a star configuration. For most of these surface applications, the links between the base stations and the central hub are short. As such, a star network is appropriate. However, a very different situation is encountered in underground mining, and hence conventional surface cellular communication networks cannot be employed.

Moreover, in an underground mining situation, the structural layout of an underground mine is typified by a series of tunnels and crossings which severely restrict radio transmission. Consequently, severe radio propagation losses are encountered along tunnels and around corners and crossings.

DISCLOSURE OF INVENTION

Accordingly, it is an object of the present invention to provide for a cellular communication network and method within an area, and parts and accessories thereof capable of handling both voice and data communications to provide improved operational efficiency and flexibility as well as reducing the cost otherwise needed for maintaining separate communication systems within said area.

It is a preferred object of the invention to provide reliable communications for multiple channels of two-way voice, monitoring data, control signals and compressed digital video signals within the network.

It is a further preferred object of the invention to provide a communication network which is capable of automatic tracking and locating of objects such as personnel and equipment within said area.

In accordance with a first aspect of the present invention, there is provided a communication network for an area including:

a plurality of cascaded base stations serially interconnected in a ring structure to form a network backbone;
  one of said base stations at one end of said network backbone comprising a network controller for controlling the network;
  a plurality of portables adapted for communication with any of said base stations by a common air interface;
  a network protocol for communicating between said network controller and said base stations or between said base stations along said network backbone; and
  a common air interface protocol for communicating between a said portable and a said base station;
  wherein the other base stations function as slaves to said network controller, and
  wherein each slave base station defines a discrete cell within which communication between a said portable disposed within said cell and said base station thereof, is able to be performed over said common air interface.

Such a network has particular utility in an underground mine, whereby the network not only enhances voice communication between mining personnel, but allows the use of distributed monitoring and control of both personnel and mining equipment. Furthermore, the communication network can be continually extended with the further progression of the mine, to provide for mine wide communications and thus provide an immediate warning to workers of dangerous situations and locations, thus improving the overall safety level of underground mines.

In accordance with a second aspect of the present invention, there is provided a base station for a communication network of the type defined in the preceding aspect of the invention, including one or more backbone controller means for communicating with the network backbone, a common air interface controller means for communicating with any of the portables within the cell of the base station, and a backplane means for controlledly interconnecting said backbone controller means, said common air interface controller means and said network backbone.

In accordance with a third aspect of the present invention, there is provided a network controller for a communication network of the type defined in the first aspect of the invention, including a communications microcontroller provided with a serial communication channel for operating the network controller and communicating with the network backbone, a microcomputer bus communications interface for connecting said communications microcontroller to a microcomputer, and a backbone communications interface connecting said communications microcontroller to the network backbone.

In accordance with a fourth aspect of the present invention, there is provided a portable for a communication network of the type defined in the first aspect of the invention, including: a communications microcontroller provided with a plurality of serial communication channels (SCC) for operating the portable and generating timing signals for enabling communication with a base station over the common air interface; a burst mode RF transceiver for receiving data from and transmitting data to a base station over the common air interface under the control of said communications microcontroller; an adaptive differential pulse coded modulation (ADPCM) means to encode analog signals input to the ADPCM means for transmitting to a portable, into a digitised bit stream for said communications microcontroller to transmit over the common air interface, and in reverse to decode digitised bit streams to be output by the ADPCM means as analog signals received from the common air interface and which are input to said communications microcontroller; peripheral devices; auxiliary control circuits; and an I$^2$C serial bus and bus controller for allowing communication and control between said communications microcontroller and said peripheral devices and said auxiliary control circuits.

In accordance with a fifth aspect of the invention, there is provided a method for communicating along a communication network as defined in the first aspect of the invention including:
  initialising the network controller and all of the base stations in the network;
  assigning prescribed operating frequencies for each of the slave base stations in sequence; and
  linking each of the slave base stations into the network backbone to commence interbase station and intrabase station communications.

In accordance with a sixth aspect of the invention, there is provided a method for establishing a common air interface (CAI) between a portable and a communication network as defined in the first aspect of the invention, said method including:

scanning through all of the carrier frequencies of the base stations connected into the network;

selecting the carrier frequency of a base station having the maximum received field strength;

listening to messages transmitted by said base station at the selected carrier frequency and identifying a free time slot on the airlink with said base station;

transmitting a log-on message to said base station after a prescribed time period from the end of said free time slot; returning an acknowledgment message from said base station to said portable after a further prescribed time period corresponding to the position of said free time slot; and communicating the identity of said portable from said base station to said network controller via the network backbone.

In accordance with a seventh aspect of the invention, there is provided a method for communicating between a portable and another party in a communication network as defined in the first aspect of the invention, said method including:

establishing a common air interface (CAI) between said portable and a base station a t the carrier frequency of said base station;

searching for a free time slot of sufficient capacity on the airlink with said base station for the particular communication;

upon finding said free time slot, sending a communication request message and identity codes of both said portable and said other party from said portable to said base station during said free time slot;

relaying the request to said network controller from said base station via the network backbone directing the request from said network controller to the base station of said other party;

selecting a free time slot of sufficient capacity on the airlink of said other party base station for said communication;

notifying said other party of the request, from the base station thereof, if sufficient capacity is available on the airlink of said base station thereof, or if there is not sufficient capacity terminating the communication; waiting for an acknowledgment from said other party after said notifying;

sending a message of said acknowledgment from said base station of said other party to said base station of said portable via said network controller; and allowing communications to proceed between said portable and said other party.

In accordance with an eighth aspect of the invention, there is provided a method for communicating between a portable and a communication network as defined in the first aspect of the invention, said method including:

establishing a common air interface (CAI) between a portable and a base station at the carrier frequency of said base station;

continuously monitoring the field strength of signals received by said portable from said base station with which said CAI is established;

searching for a stronger field strength of other base stations at different carrier frequencies with which a CAI is not established, upon said field strength of the established CAI falling below a prescribed threshold;

switching said portable to the carrier frequency of a new base station having a CAI with a stronger field strength above said threshold after said searching; establishing a CAI between said portable and said new base station; and disabling the CAI with the old base station having a field strength below said threshold.

BRIEF DESCRIPTION OF THE DRAWINGS

The invention will be better understood in the following description of one specific embodiment thereof. The description is made with reference to the accompanying drawings wherein.

BEST MODE OF CARRYING OUT THE INVENTION

The embodiment is directed towards a wide band radio communication network and method for communicating for sub-surface applications specifically concerned with an underground mine, which network is capable of handling and monitoring multiple channels of two way voice, data, control and video signals.

Figure 1:
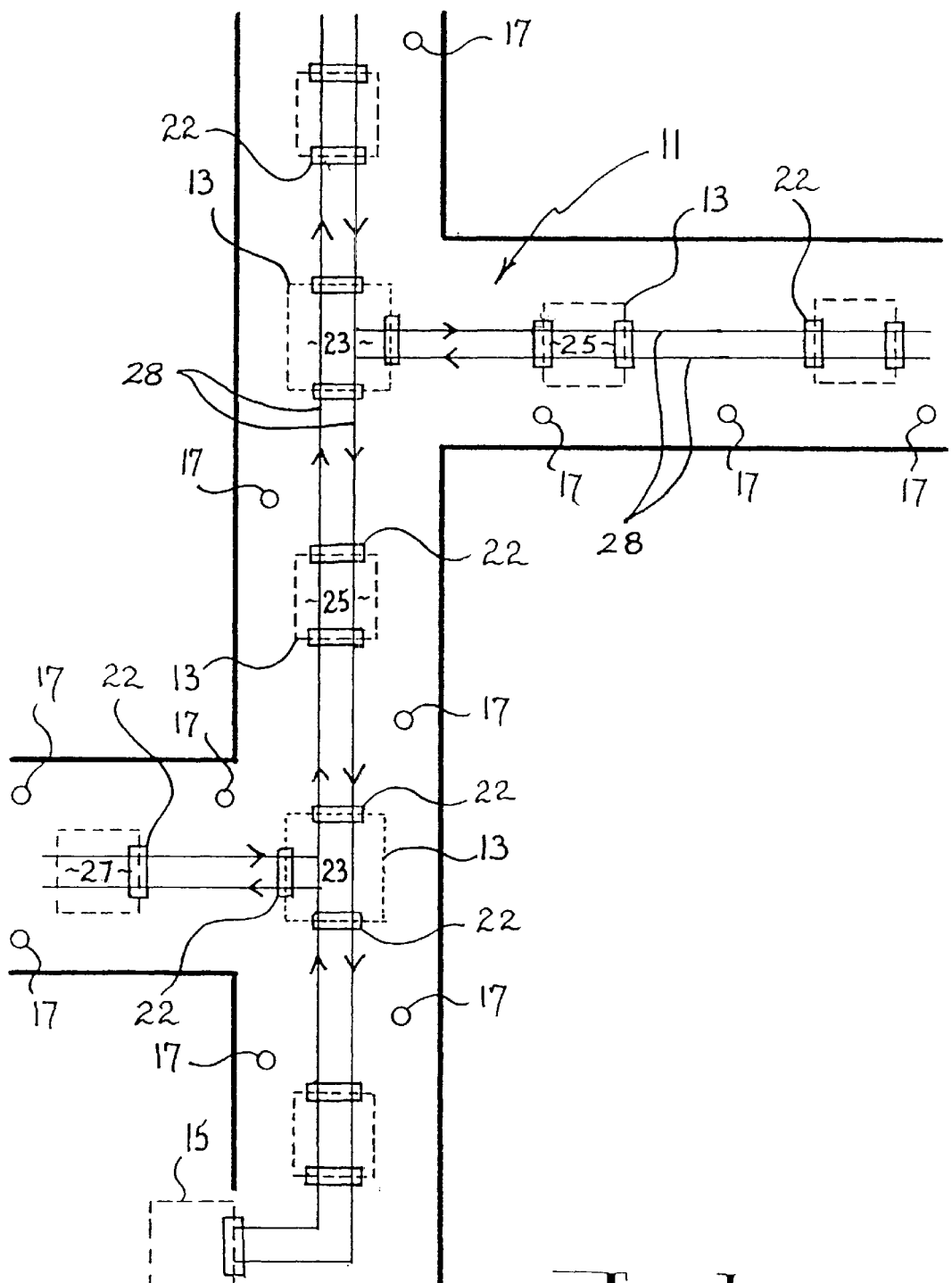
FIG. 1 is a schematic plan view showing the ring structure of the network, as disposed within an underground mine.

As shown in FIG. 1, the network generally comprises a segmentable ring structure 11 which has a plurality of serially interconnected and cascaded base stations 13, one base station being a network controller 15, a plurality of portables 17, a network protocol 19 (FIG. 3) for communicating between the base stations, and a common air interface protocol 21 (FIGS. 4 and 5) for communicating between a portable and a base station.

The coverage area of the mine is divided into individual zones or cells, whereby one or more slave base stations 13, each define a discrete cell for relaying signals along the network 11 as well as serving portables 17 moving through or stationed within a cell.

A base station 13 can be of a variety of different forms, depending upon the number of backbone ports 22 required. For example a base station may be in the form of a multi port base station 23 (comprising three or more ports), a dual port base station (repeater) 25, or a single port base station 27 (eg the network controller).

The ring structure 11 forms a network backbone with the network controller 15 constituting a master base station disposed at one end of the network backbone and the other base stations 13, in their normal mode of operation, constituting slaves. Accordingly by connecting the base stations in a cascaded configuration whilst maintaining the ring structure, simple and flexible extension of the communication network is possible to cope with the progression or expansion of the mining area.

The network protocol 19 for the communication link between the base stations 13 and the network controller 15 allows for an interchangeable communication medium to be used between adjacent backbone ports 22. Normally a common communication medium in the form of a twisted pair cable 28 is used throughout the entire network backbone. However, other communication media such as coaxial cable, fibre optic cable, a wireless link, or any combination of these communication media may be used. This is achieved solely by appropriate design of the backbone port 22 of each base station and does not affect the remaining design of the base station. Consequently, the base stations 13 are highly flexible and the network can be controlled to provide such system reliability and improvement measures as bypassing of a faulty backbone port in a base station, or bypassing of a faulty base station altogether.

Each slave base station 13 has an airlink port 47 for communication with the portables 17 disposed within the cell of airlink communications served by that airlink port and hence served by the base station. Accordingly, the ring structure 11 allows for the base stations to be spaced along the network backbone at prescribed spacings to ensure complete cell coverage of the mining area.

Figure 2:
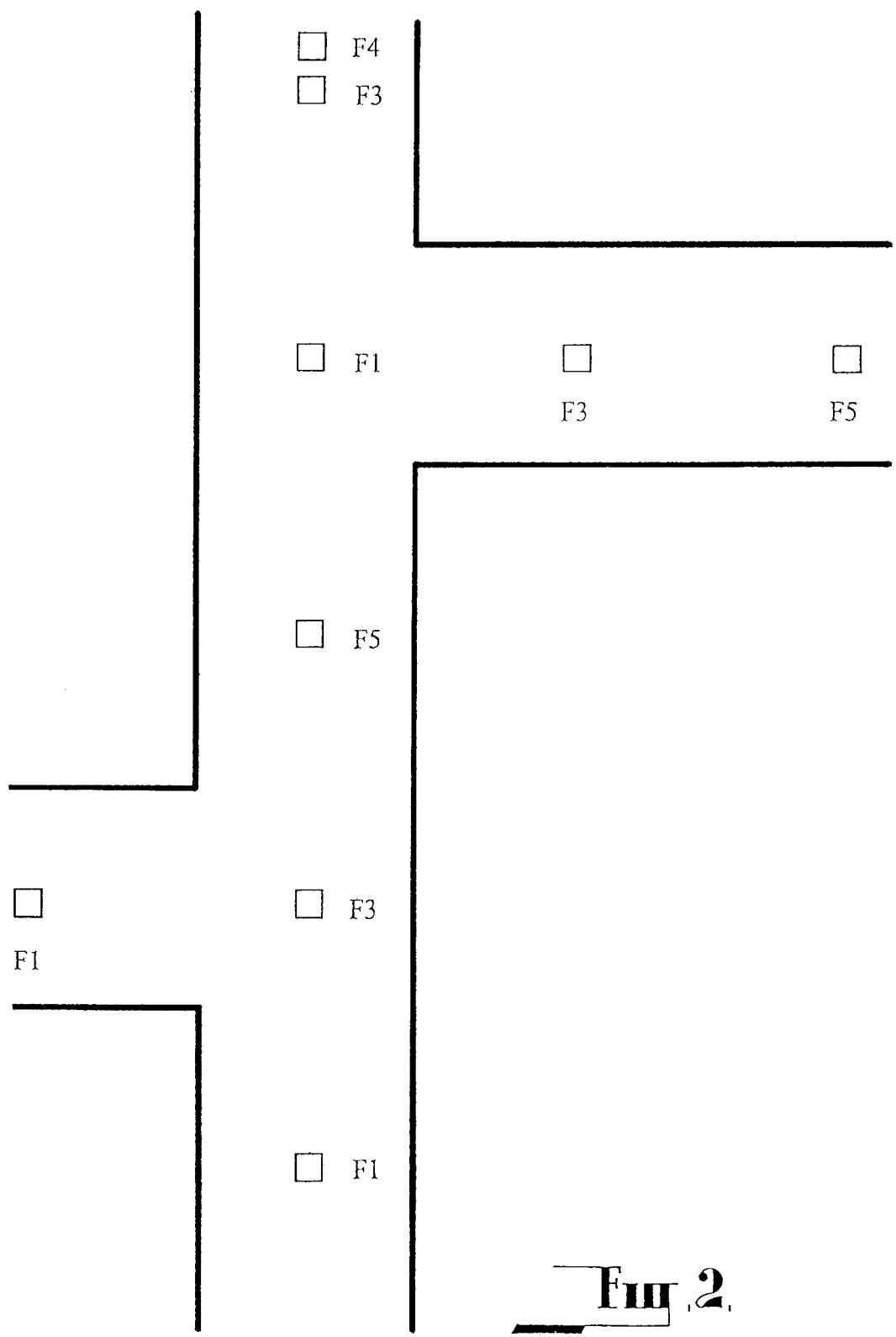
FIG. 2 is a schematic plan view of a frequency plan adopted for the base stations of the ring structure shown in FIG. 1.

The frequency band adopted for the common air interface (CAI) of each of the slave base stations is within the UHF band, eg 902 to 928 MHz, known in North America as the Industrial, Scientific and Medical Application (ISMA) band. The CAI for each base station uses 1 of 5 or more different carrier frequencies F1–F5 spaced 1 MHz apart in the 900 MHz band. To minimise adjacent interference, adjacent base stations are assigned carrier frequencies which are 2 MHz apart for CAI communications. As shown in FIG. 2, the same carrier frequency Fn can then be reused every third base station in order to keep the co-channel interference to a tolerable level. Consequently, only three frequencies are needed for coverage in a straight tunnel.

The choice of UHF, eg 900 MHz, is based on technical and economic considerations. The wide band nature of the network suggests that high frequencies such as UHF be used for communications along the network. At these frequencies, the specific attenuation associated with natural propagation in a straight tunnel is low, thus allowing a larger spacing between base stations. However, considerable signal attenuation is encountered immediately around a corner. Signal attenuation of about 28 dB per corner at 1000 MHz has been reported in an underground coal mine. Furthermore, signal attenuation is a function of the cross-sectional dimensions of the tunnel. Therefore by adopting a nominal transmission power of about 100 mW or slightly lower, a distance of anywhere between 100 m to over 500 m, depending on the propagation environment, is required between base stations. Accordingly, a nominal spacing of 200 m has been adopted for the purposes of the present embodiment, which is considered to be appropriate for locating the movement of portables provided with personnel and equipment throughout the mine area.

A further reason for choosing UHF is that the UHF operating environment is almost free of electrical interference from mining machinery. With low power operation, UHF waves are well contained underground and will not cause interference to other radio systems above ground. This requirement is vital for system approval by the relevant regulatory authority.

When working in a confined environment like an underground mine, size is important, whereby small transportable transceivers are desirable. When operating at 900 MHz, a small low profile antenna can be concealed within a transceiver enclosure inside a miner helmet for added antenna protection and operational convenience. Further, an economic advantage of operating at 900 MHz is the possibility of adopting an extensive range of electronic components which have already been developed for the UHF cordless and cellular telephone markets.

The communication network uses digital modulation for voice and video communications as well as data communications as opposed to analog modulation presently used in most mining applications. Accordingly, digitisation of speech is performed using 32 kb/s adaptive differential pulse coded modulation (ADPCM) compliant to CCITT recommendation G712. By adopting digital modulation, several voice and data channels can be time division multiplexed and transmitted on a single carrier frequency. Accordingly, by adopting the time division multiple access (TDMA) technique, a set of voice and data channels can be flexibly shared among all users in the system. In addition, two or more voice channels can be combined to increase the capacity needed for transmission of an appropriately compressed digital video signal. With respect to the CAI, the digital modulation technique used is binary frequency shift keying (BFSK) with base band prefiltering.

Now describing the network and CAI protocols in detail, integrated full duplex voice and data communication is realised for communicating along the network backbone using the technique of time division multiple access (TDMA). This technique is applicable for wired or wireless inter-base station links and hence is suitable for both the network and CAI protocols of the present embodiment. The automatic performance monitoring of base stations and tracking of portables are some of the important features that can be supported by the network protocol.

With respect to the CAI protocol, in order to simplify the hardware realisation of the base station, multi user dynamic channel allocation for the CAI is carried out using a combination of TDMA and time division duplex (TDD). This technique provides for full duplex, multi-channel integrated voice and data transmission over a CAI. With TDD, a transceiver transmits and receives in sequence for a prescribed time interval using the same carrier frequency. For real time voice transmission, this will require that the digitally modulated voice signals using 32 kb/s ADPCM, be compressed in time and transmitted as a short burst at a higher rate. On reception, time expansion is performed to recover the original voice signals.

In both protocols, a framing structure using corresponding time slots of basic frames which make up a superframe are controlled to constitute discrete channels which are selectively adopted for communicating video, voice or data signals. Importantly, specific channels are not permanently dedicated for solely voice, data or video communications, but are interchangeable for different communication types, depending upon the availability of the channel for an intended communication.

Figure 3:
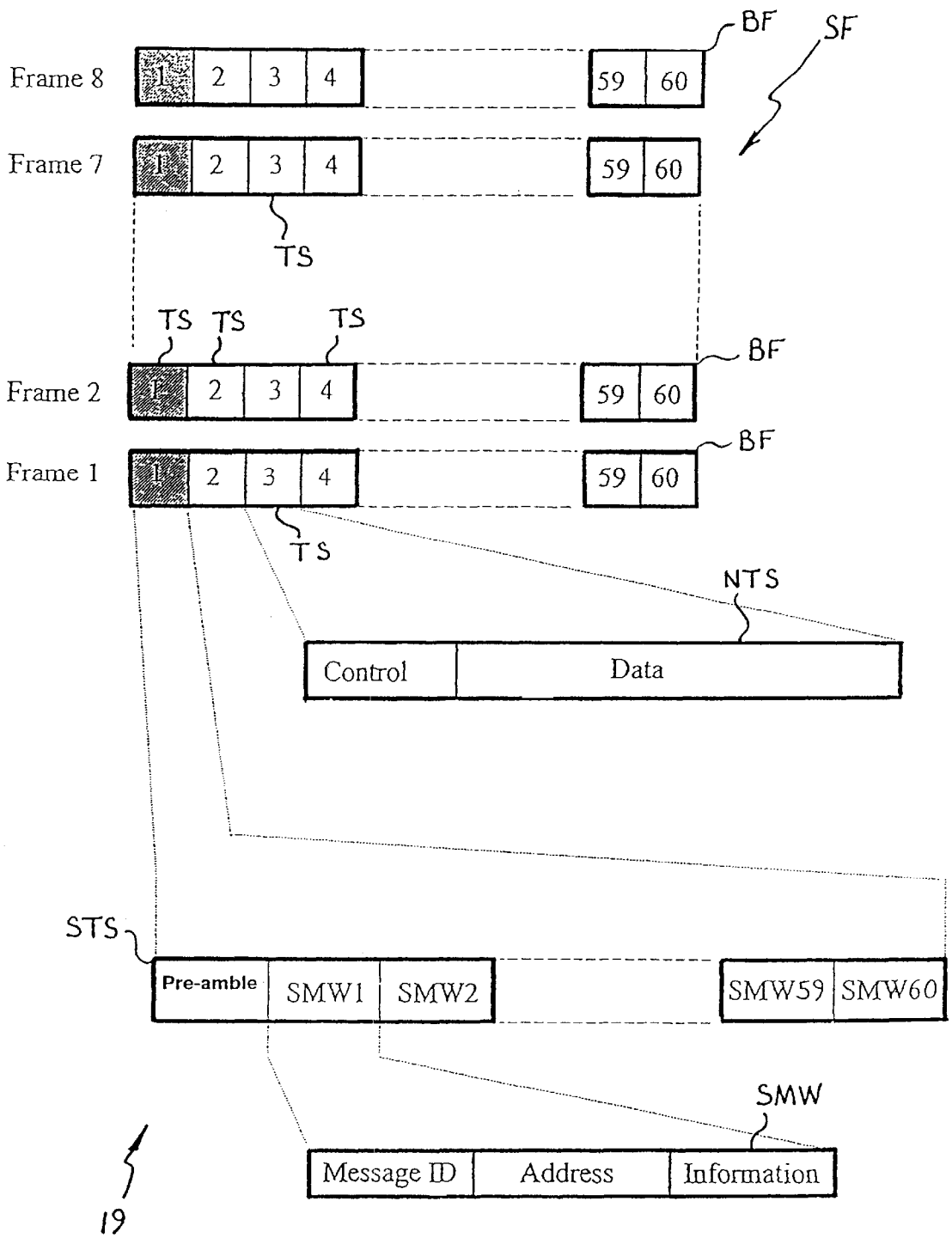
FIG. 3 is an illustrative drawing showing the makeup of the network protocol constituting the backbone frame structure of the network.
Figure 4:
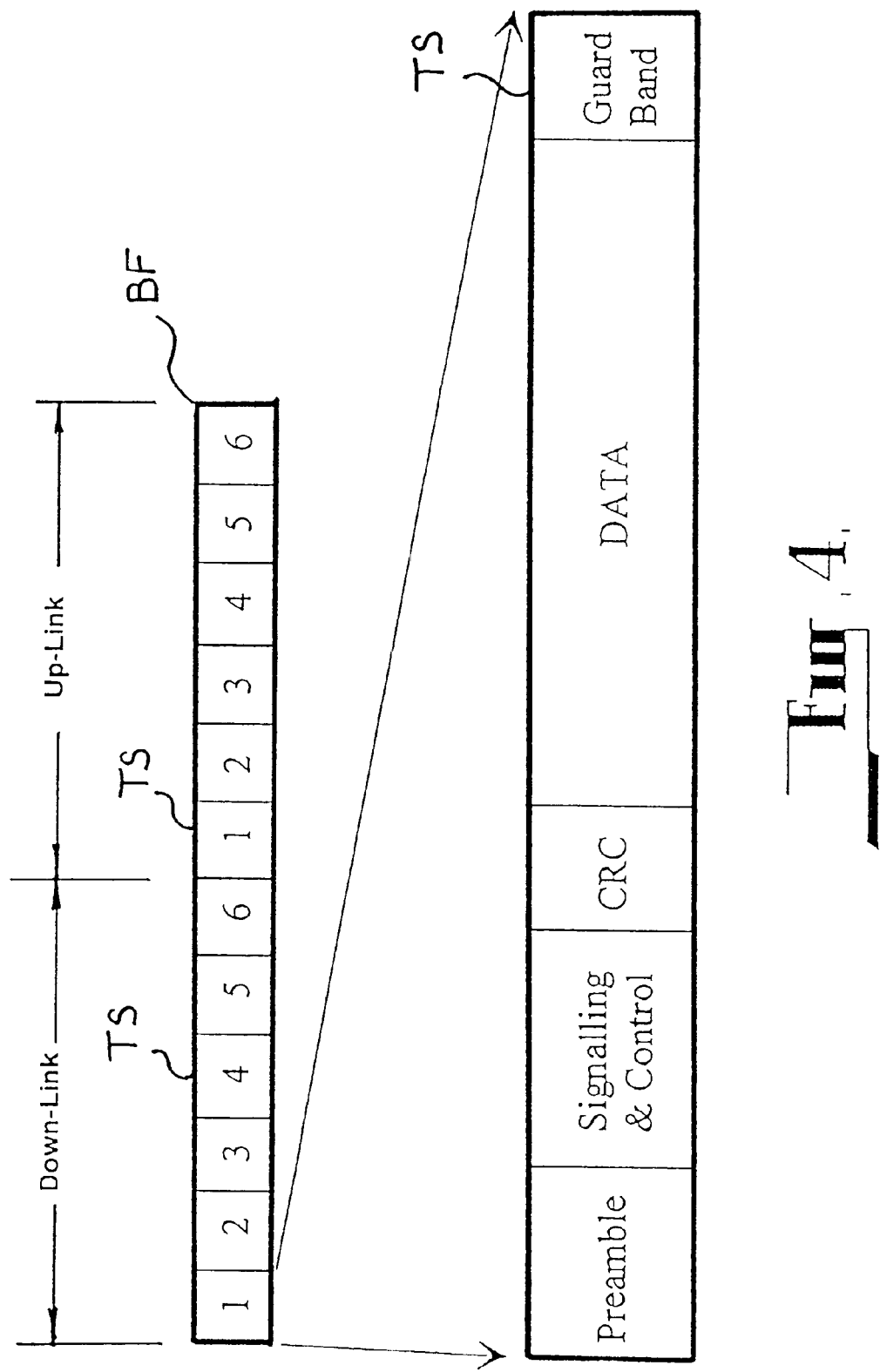
FIG. 4 is an illustrative drawing showing the makeup of a basic frame used in the common air interface network.
Figure 5:
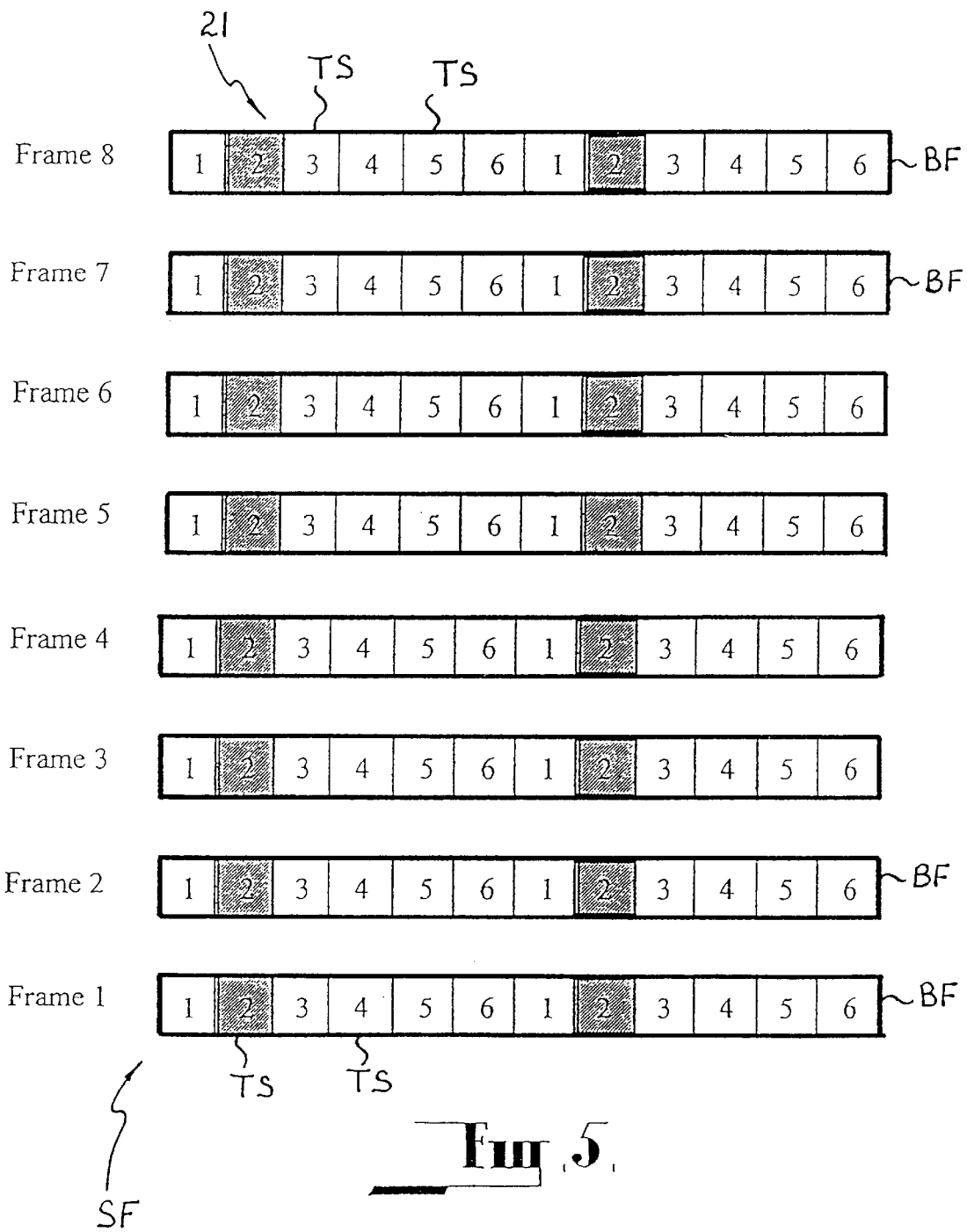
FIG. 5 is an illustrative drawing showing the make up of a superframe comprising basic frames of the type shown in FIG. 4 of the drawings.
Figure 6:
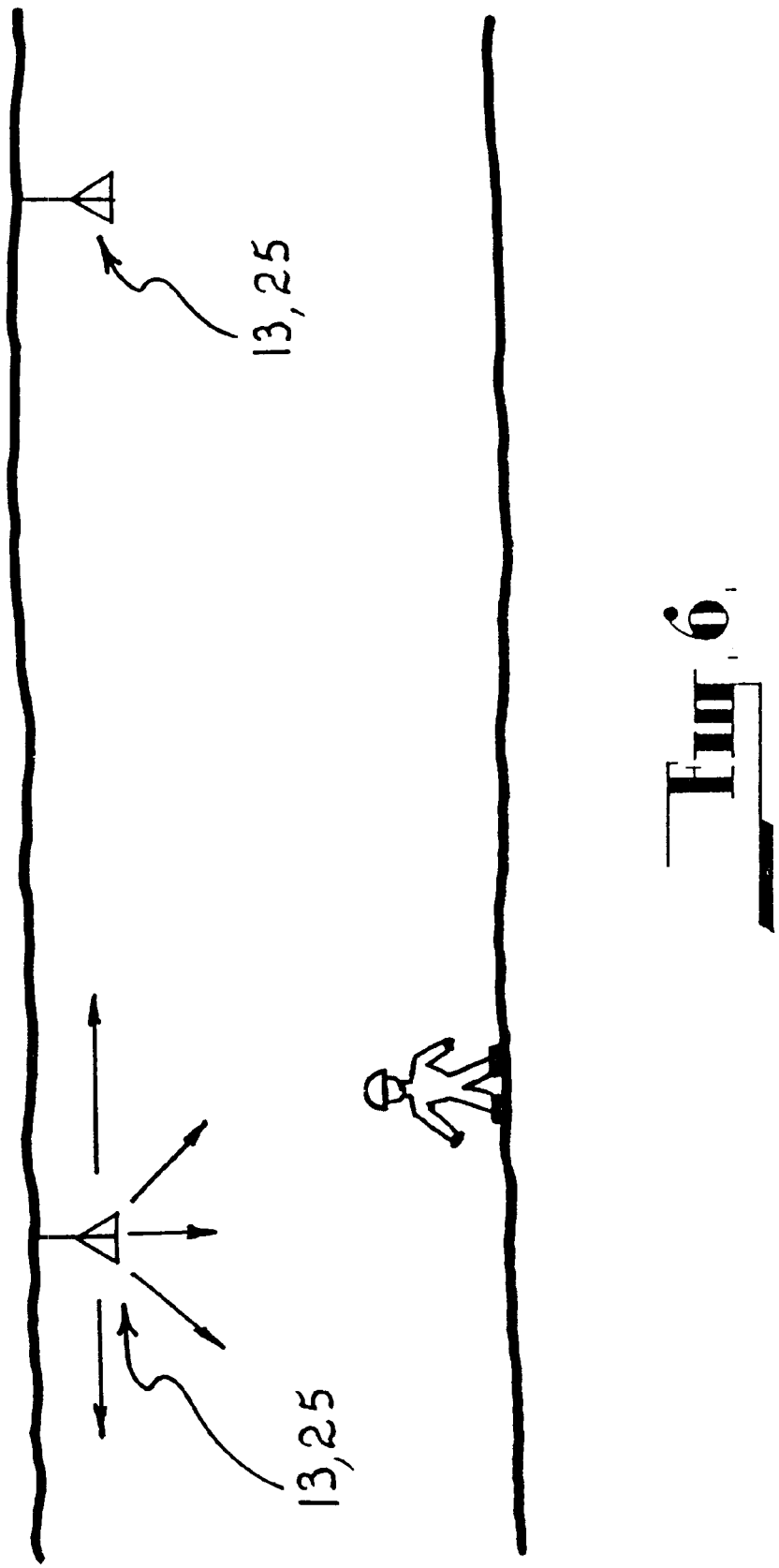
FIG. 6 is a schematic side elevation showing the physical location of repeated base stations within a section of a mine.

In describing the TDMA technique adopted for the network protocol and the TDMA-TDD technique adopted for the CAI protocols in more detail, reference is made to FIGS. 3, 4 and 5 of the drawings.

In the case of the network backbone protocol 19, as shown in FIG. 3, the TDMA framing specification involves generating a series of basic frames BF which are grouped together in sequences of 8 frames to form a superframe SF. Each basic frame BF consists of a plurality of time slots totalling 60 in the present embodiment, each time slot being of 1 millisecond duration and containing 2048 bits of data, requiring the network backbone to have a transmission rate of 2.048 Mb/s. Thus, a superframe comprises 8 basic frames of 60 milliseconds each, providing for a total superframe length of 480 milliseconds.

The first time slot of each basic frame BF comprises a signalling time slot STS which comprises a 128 bit preamble word divided into a 14 byte bit synchronisation/guardband signal and a 2 byte frame synchronisation signal (not shown), and 59 subsequent signal message words SMW1 to SMW59, each comprising 32 bits. Importantly, the signalling time slot STS is communicated in the first time slot of each frame making up the superframe SF. The advantage of putting a preamble word in front of each basic frame, is that it functions as a guardband to accommodate for timing tolerances between the receive and transmit clock frequencies in addition to allowing for more reliable synchronisation and quick resynchronisation in the event of synchronisation failure, which means that the protocol can be used for different types of transmission link including radio links.

Each signalling message word SMW is associated with a particular base station. Thus, in accordance with the basic framing specification of the present embodiment, up to 60 base stations can send "eight" signalling messages per superframe (one in each basic frame), or up to 240 base stations can send two signalling messages per superframe. The network controller makes the allocation on the frequency of signalling messages based on the number of base stations at the time of network startup. Further, each base station only uses its own SMW to send signalling messages to the network controller 15 and vice versa. An SMW contains three fields, namely the message identification field which is 8 bits in length, the address field which is 16 bits in length and the information field which is 8 bits in length. The message identification field is used to encode the actual message being sent, so that the address and information fields can be properly understood. The address field generally contains the address of the relevant portable station, while the information. field contains message specific information such as status values etc. The message identification field is further broken down to comprise: a one bit acknowledgment flag to signal if the channel message is an acknowledgment message; a one bit broadcast flag to signify whether the channel message should be received by all base stations in the network, or whether the channel message should only be received by the base station it addresses; and a 6 bit message code which specifies the particular nature of the message. For example, message codes are provided for signifying a null message, a call initiation message, a call termination message, a base station reset message, a base station address list message, a base station I/O configuration message, a base station user group initialisation message, a base station miscellaneous initialisation message, a backbone call data message, a base station test message, a portable station list message, backbone call registration message.

The remaining 59 time slots TS, making up the total basic frame duration of 60 milliseconds, are normal time slots NTS and each comprise a control field of 128 bits and a data field of 1920 bits. Consequently, the maximum data rate per channel comprising 8 corresponding basic frame time slots is 32 kb/s and the minimum data rate per channel comprising a single basic frame time slot per channel is 4 kb/s.

The normal time slots are provided for communicating compressed video, voice or data signals. With respect to voice and data, the network therefore has a capacity of 59×32 kb/s duplex voice channels or 472×4 kb/s duplex data channels, or a combination of voice and data channels up to a data rate of 1,888 kb/s.

A normal time slot NTS comprises a 16 byte control field and a 240 byte data field. The control field conveys critical information such as message codes, base station and portable station addresses, and other important control information depending on the backbone network message which is being transferred. The data field is used during the network startup procedure when large amounts of information need to be sent to each slave base station from the network controller 15, and during intercell calls, when either speech or data call information is transferred. The data field is exactly five times larger than the data field in a CAI channel which makes for transferring call information between the network backbone and the CAI channels much easier than would otherwise be the case.

The control field of a normal time slot is divided into: a 1 byte message identification field which contains the code value identifying the type of message contained in the channel; a 1 byte base station address field which contains the address of the base station for which the message is destined; a 2 byte portable station address field which contains the address of the portable station to which the message is relevant; a 2 byte call identification field which is provided to enable the base station to associate incoming and outgoing channels with specific calls; a 1 byte status field which contains status information during call initiation such as backbone data rates, current call status and a busy bit indicating whether a call has been denied or connected; a 1 byte call type field which describes the type of call that the channel is a part of, eg a speech call or a data call; a 1 byte base station call source field and a two station portable station call source field which are respectively used during call initiation to allow identification of the base station and the portable station which initiated the call; a 1 byte information field containing general information which is relevant to each message such as call priorities, user priorities and the like; and a 4 byte field reserved for future use.

The message identification field comprises a 1 bit acknowledgment flag for indicating whether the channel message is an acknowledgment message or not; a 1 bit broadcast flag for indicating whether the channel message is intended to be received by all base stations in the network or only the base station it specifically addresses; and a 6 bit message code which specifies the particular nature of the message in the same manner as the message identification field operates in relation to the signalling message word SMW previously described.

The structure of the status field is such that a 4 bit current call status field is provided which is used during call initiation and call termination to indicate the call status, a 3 bit data rate field used only during call initiation to indicate the number of backbone channels per superframe which are allocated to the call, and a 1 bit busy flag used only during call initiation to signify whether the call can be connected or whether the call must be denied.

The call type field is structured to contain: a 1 bit ghost control message flag to signify whether a single 4 kb/s timeslot currently being used for a full 32 kb/s channel speech call, can be used for a one off data call when all of the channels are being used for speech and/or data calls; a 1 bit emergency call flag; a 1 bit normal speech call flag; a 1 bit general data call flag; a 1 bit normal control message flag; and 2 reserve bits.

The information field structure is such that there is provided a three bit priority level field providing for eight levels of priority and 5 bits reserved for future use.

In the case of the CAI protocol, as shown in FIGS. 4 and 5, TDMA-TDD is used to provide a series of basic frames BF once again, which are grouped in frames of 8 to form a superframe SF. In this case, however, the basic frame consists of 12 time slots of 1 millisecond each, making for a maximum length of 12 milliseconds. The first six time slots are used for transmitting from the base station 13 to the portables within the cell thereof and the remaining six time slots are used for transmitting in the reverse direction, from a portable to the base station. In this case, the superframe being made up of eight 12 millisecond frames, forms a total superframe length of 96 milliseconds.

Each time slot TS of a basic frame is made up of 512 bits, the bits being formed by a 32 bit preamble word, a 64 bit signalling and control word, a 16 bit cyclic redundancy check (CRC), a 384 bit data word, and a 16 bit guard band. As a result, the transmission bit rate for the CAI is 512 kb/s and a time slot in each frame of a superframe corresponds to a gross information capacity of 4 kb/s, which forms the basic, data rate. Data rates and multiples of this base rate up to a maximum of 192 kb/s per carrier may be specified by the user. For example, the transmission of 12 kb/s data will require the assignment of a time slot in three out of the eight frames in a superframe. Similarly, a 32 kb/s ADPCM voice channel will occupy the same slot position for all of the eight consecutive frames in a superframe. Using this arrangement, a base station with one carrier will have the capacity of six full duplex voice channels, or an equivalent number of data channels in multiples of 4 kb/s, or a combination of voice and data channels.

To simplify the implementation of the CAI, a voice channel will use the same time slot for all of the eight basic frames in a superframe. Also, several data channels with aggregate capacity of less than 32 kb/s will be grouped together and occupy the same slot position in subsequent frames of a superframe. This measure will result in preserving more groups of time slots appropriate for voice transmission.

Describing the makeup of each time slot in more detail, the preamble field contains bit and frame synchronisation information, the control field contains address, signalling and control information, the data and CRC fields are self explanatory, whilst the guardband provides protection for tolerances in the clock frequencies of the base station and portable.

In use, assuming that a portable has been granted a channel, it will wait to receive the message from the base station before it replies. Therefore, if the base station sends a message to the portable in timeslot 1, for example, then the portable will receive this message and wait for 6×512 bits, ie half the length of the frame, before replying to the base station.

The bit synchronisation word contains the bit pattern, 10101010 10101010 for clock recovery. The frame synchronisation word is used by the portable stations to recognise the start of each channel transmitted by the base station and vice versa. All base stations use a particular frame synchronisation word and all portables use a different frame synchronisation word to avoid conflicts.

The control field of an airlink channel contains several sub-fields, namely: an 8 bit message identification code field containing the code value identifying the type of message contained in the channel; an 8 bit call identification field which allows the base station and portable station to associate incoming and outgoing channels with specific calls; a 16 bit address field which contains the address of the portable station which is either the source or destination of the channel data; a 16 bit information field containing information which is specific to each airlink message; an 8 bit call type field which describes the type of call that the channel is a part of, eg a speech call or a data call; and an 8 bit channel allocation field which contains the information required by a portable station in order for it to determine whether or not enough channels and consecutive frames are available for it to make a request for such channels.

The message identification field is similar to that described in relation to the network protocol and comprises an acknowledgment flag, a broadcast flag and a message code. Similarly, the call identification field is similar to that of the network protocol, containing a ghost control message flag, an emergency call flag, a normal speech call flag, a general data call flag and a normal control message flag. However, instead of including 3 reserve bits, the call type field in the CAI protocol includes a 3 bit frame count which identifies the frame number within a superframe that is being transmitted.

The CRC field contains a 16 bit cyclic redundancy code which is calculated on the control field and is used to protect the control field only. The data field is 48 bytes in length and is used to carry information during speech and data calls. Hence it is only used in conjunction with the call data message of the control field and the mobile group address message which requires user group information to be sent via the data field.

The guardband is a 2 byte field at the end of each airlink channel and is not an information carrying field. It is used as a buffer between consecutive airlink channels so that important airlink data does not collide. The guardband also has the additional benefit of aiding the clock recovery circuit in the RF transceivers of the portables and the base stations.

It should be appreciated that applications requiring larger capacity for handling the communications of a large number of portables within a particular cell can be built up by adding additional carrier frequencies. As shown in FIG. 2, this can be effectively created by adding additional base stations F3, F4 in close proximity to each other within the particular area in question, thereby providing overlapping cells at different carrier frequencies for handling the increased local communication traffic from portables disposed within the overlapping cells.

The use of TDMA radio links results in fewer radio transceivers in a base station 13. In addition, the technical specifications for some critical components such as oscillators, selectivity filters and frequency synthesisers can be significantly relaxed leading to transceivers of lower cost and smaller size.

The maximum capacity per carrier is 6×32 kb/s full duplex voice channels. However, data rates are user selectable in multiples of 4 kb/s up to a maximum of 192 kb/s per carrier. Digital video is encoded at a rate up to 192 kb/s per carrier.

Figure 8:
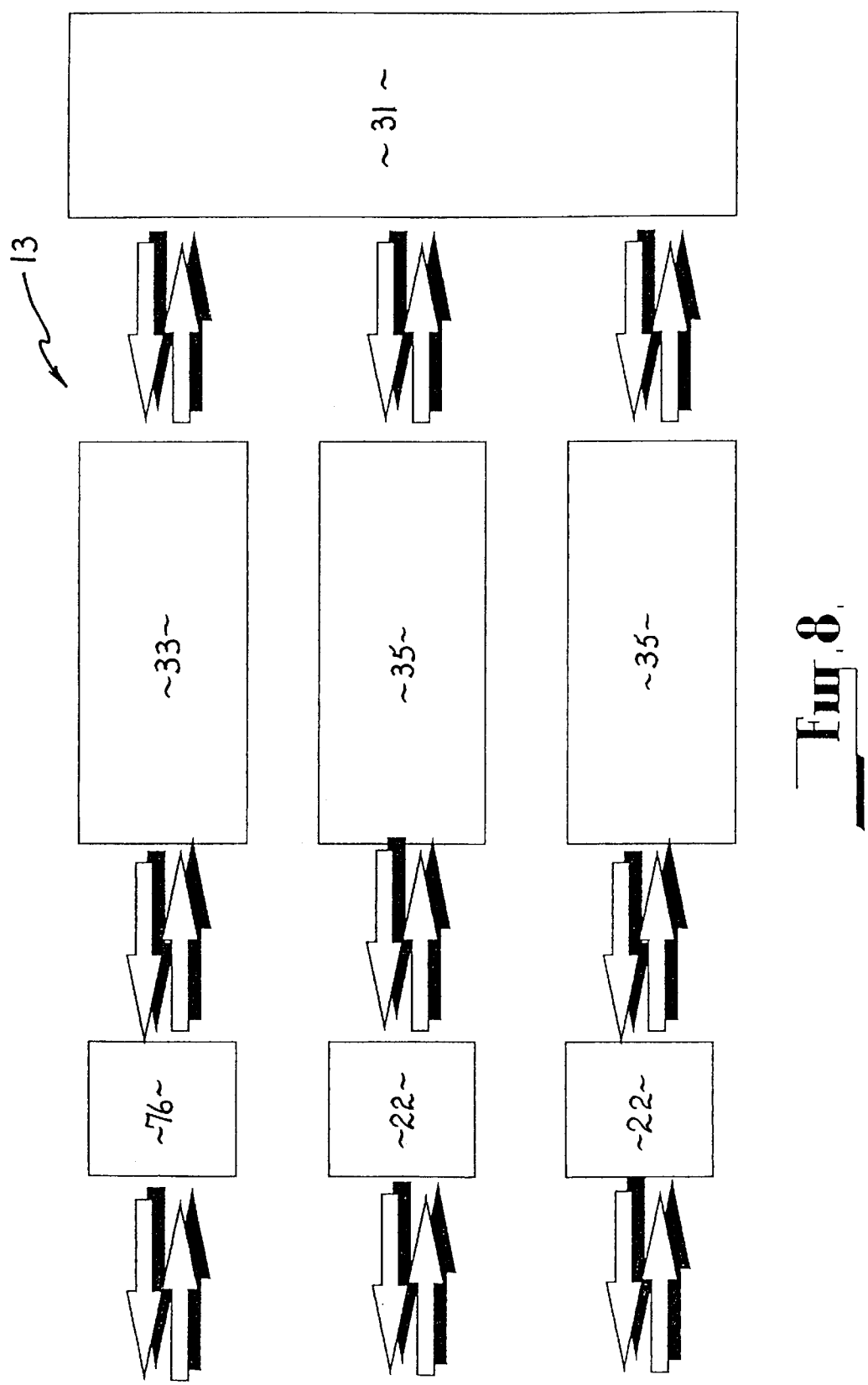
FIG. 8 is a block diagram showing the general configuration of a base station.

Now describing the base stations in further detail, as shown in FIG. 8, the basic configuration of a base station 13 comprises a backplane means 31, a common air interface (CAI) controller means 33 and one or more backbone controller means 35, depending upon the number of backbone ports 22 making up the base station. Moreover, there are as many backbone controller means 35 provided as there are backbone ports 22. For example, in the case of a single port base station 27, there is provided only one backbone controller means 35. In the case of a repeater 25 there are two backbone controller means 35. In the case of a multi port base station 23, that is the base station having more than two backbone ports 22, there are the equivalent number of backbone controller means 35 as there are backbone ports.

Figure 9:
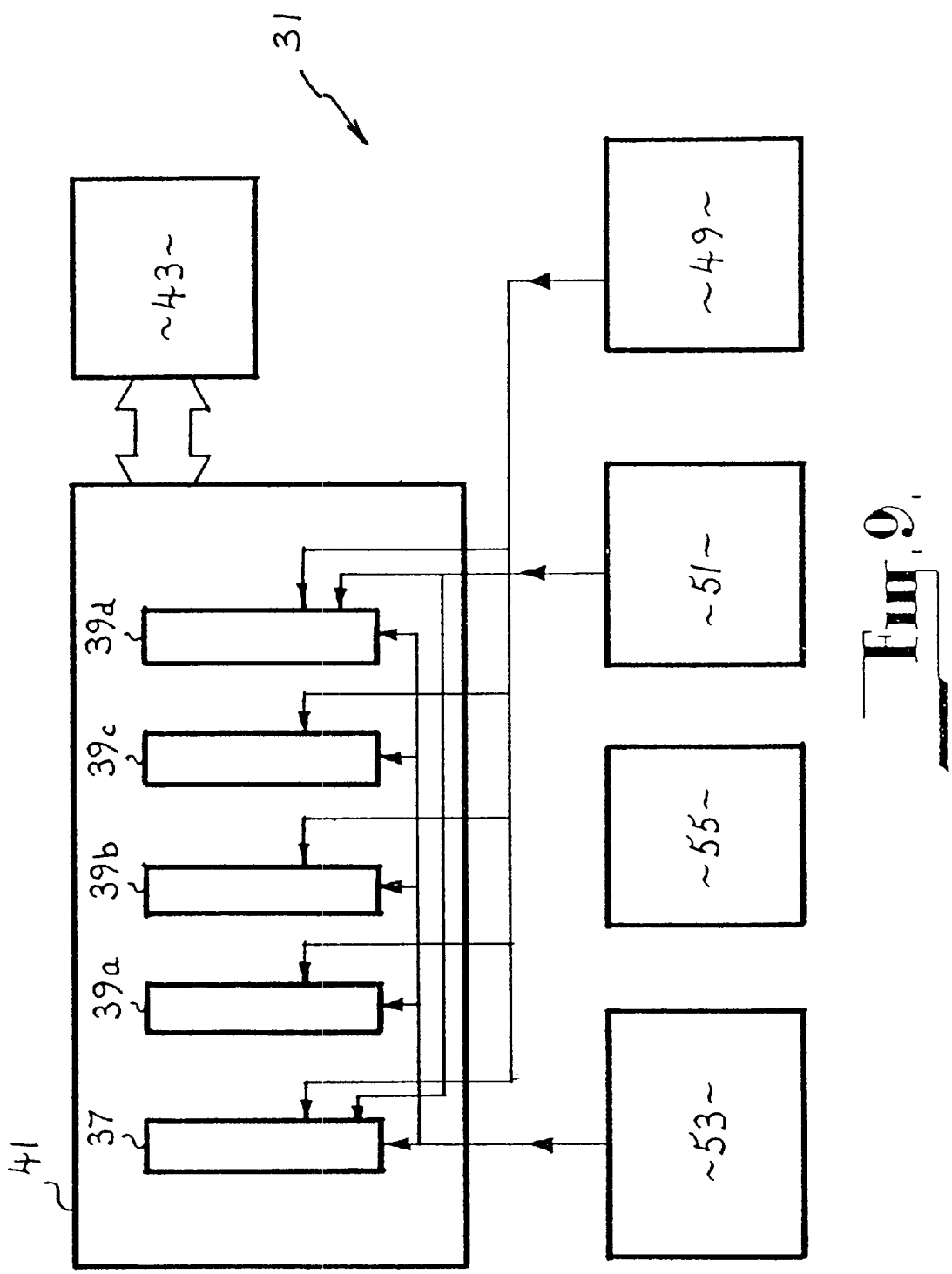
FIG. 9 is a block diagram showing the configuration of the backplane of a base station.

The backplane means 31 as shown in FIG. 9 of the drawings, essentially comprises a plurality of backplane connectors for slots 37 and 39 which connect to a backplane bus and a series of bus drivers (not shown) which form part of the main backplane module 41. The slot 37 is an airlink slot to which the CAI controller means 33 is connected and the slots 39a to 39d comprise backbone slots for each of the backbone controller means 35 included in the base station. As shown in the drawing, there are four backbone slots provided enabling the base station to be configured in the form of a single port base station 27, a repeater 25, or a multi port base station 23 comprising three or four ports.

A base station address identifier means 43 is connected to the backplane bus of the main module 41 and comprises a plurality of DIP switches which can be set to identify a unique address for the base station, readable via the backplane bus.

The backplane means 31 also includes a round robin bus arbitration sequencing means 49 for sequentially enabling and disabling communication between the CAI controller means 33 and the various backbone controller means 35 with the backplane bus via the backplane connectors for the slots 37 and 39 respectively. Accordingly, only one connector is enabled to the backplane bus at a time so as to prevent clashes between the data flow along the bus. A clock driver 51 is also included in the backplane means to generate the master internal clock for the base station at a frequency of 20.48 MHz which is used as the main internal clock source for all modules of the base station, ie the backplane means 31, the CAI controller means 33 and the backbone controller means 35. A base station resetting means 53 also forms part of the backplane means 31 and comprises power on and hardware reset circuitry to initialise the base station during power up and to enable local resetting and initialisation of the base station. Finally, the backplane means 31 includes a backup power supply 55 in the form of a battery and decoupling circuitry which is controlled by an automatic switch, to switch into the power supply circuits of the backplane means 31, which is usually supplied by power via the network backbone, in the event of a power supply failure in the common communication media interconnecting the base stations.

Figure 10:
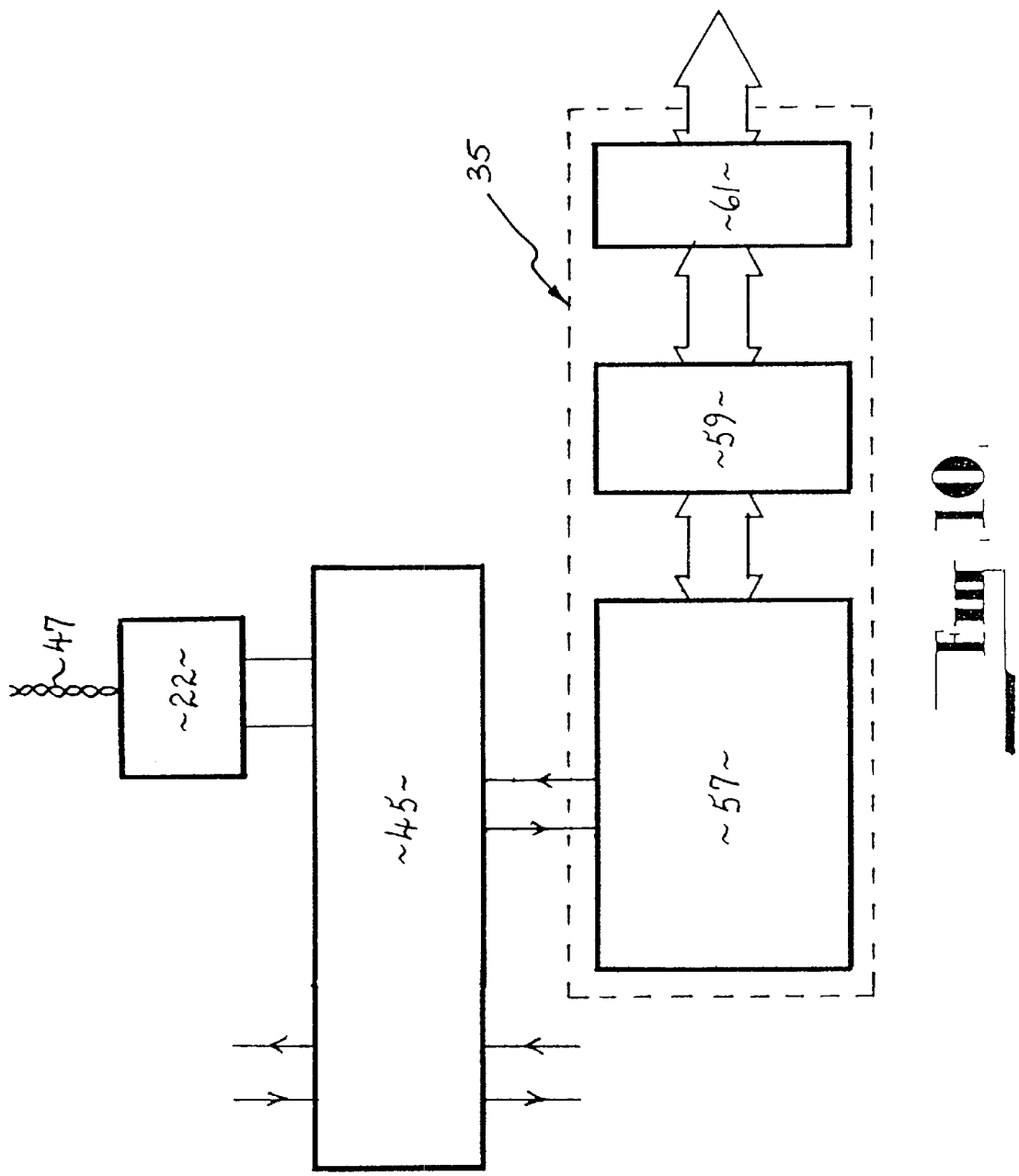
FIG. 10 is a block diagram showing the configuration of the backbone controller of a base station.

A port router or assigner 45 shown in FIG. 10, common to all of the backbone controller means 35 for which slots are provided is physically disposed on the backplane, although not being directly connected to the backplane bus or other components of the backplane means 31. Accordingly, the port router has a plurality of channels, each channel interconnecting corresponding backbone controller means 35 with a backbone port 22, for the purposes of routing information between the backbone controller means and the network backbone. The backbone port 22 is in the form of a backbone port interface circuit also disposed upon the backplane, whereby a separate backbone port interface circuit is connected to each channel of the port router 45. Each backbone port interface circuit is in turn directly connected to a corresponding twisted pair 47, being the common communication medium of the network backbone. In order to avoid confusion, the port router 45 and backbone ports 22 are shown in FIG. 10 of the drawings but not in FIG. 9, notwithstanding the fact that they physically appear on the backplane and not on the backbone controller card.

The backbone controller means 35 essentially comprises a communications microcontroller 57 in the form of a Motorola MC68302 IMP integrated circuit running at 20.48 MHz as supplied by the clock driver 51 and associated support circuitry and software including synchronisation circuits. The microcontroller 57 performs all the major processing of the base station with respect to communications along the network backbone. Consequently, the microcontroller 57 is concerned with processing communications data received by the base station from the preceding base station and transmitting communications data to the next base station along the network backbone. The important functions of the microcontroller and software will be described in more detail later. The backbone controller means 35 also includes a pseudo-dual-port dynamic memory means in the form of RAM 59 and a backplane bus interface means 61 which is connected via the corresponding backbone slot 39 to the backplane bus of the backplane means to enable backplane communications.

As shown in FIG. 10, the microcontroller module 57 is also connected to the port router 45, and in particular, to the channel of the router corresponding to the backplane port 22 for the particular backbone controller means 35 for the purposes of transmitting to and/or receiving data from the network backbone.

Figure 11:
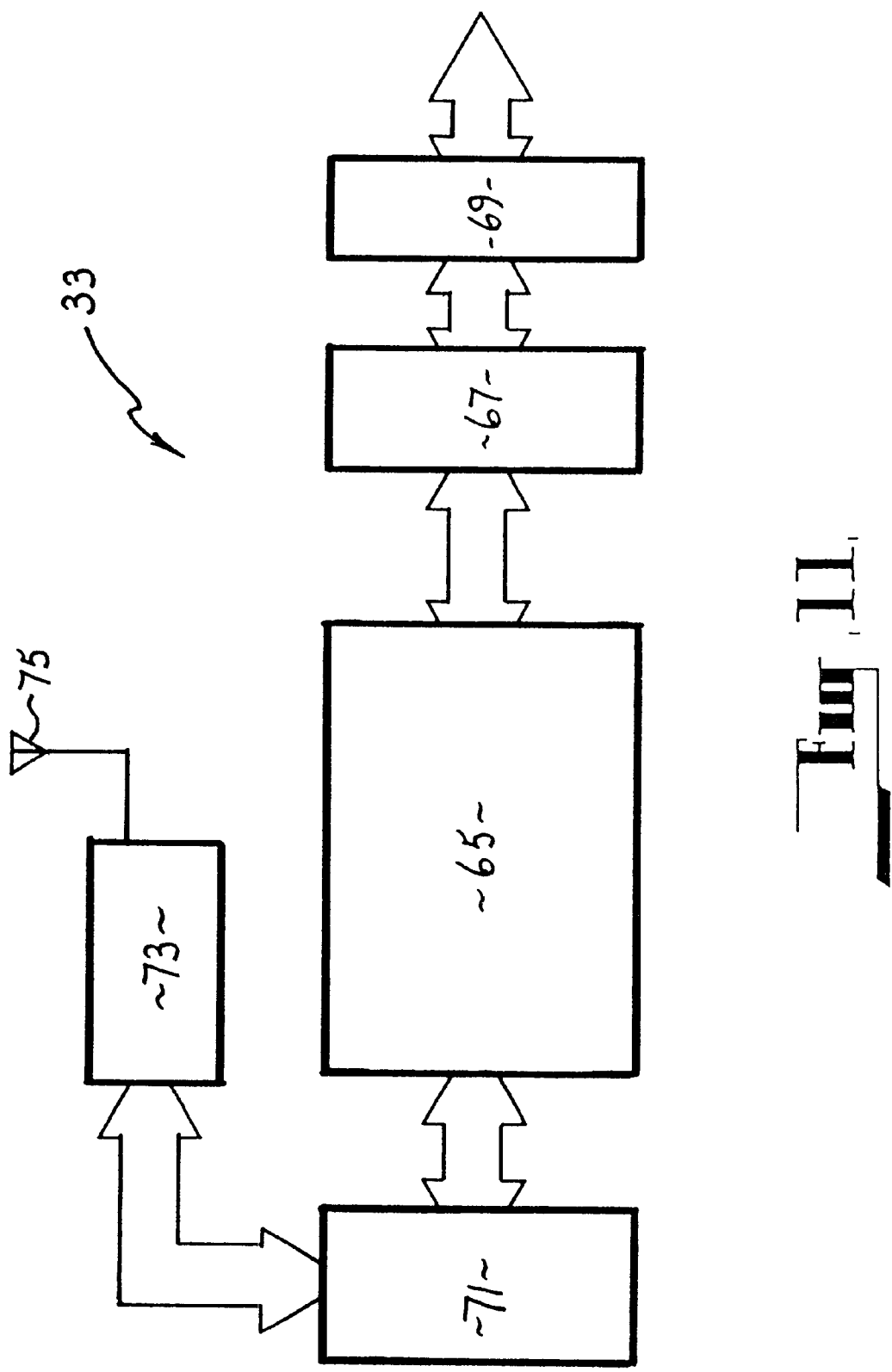
FIG. 11 is a block diagram showing the configuration of the common air interface controller of a base station.

The CAI controller means 33 as shown in FIG. 11 of the drawings generally comprises a communication microcontroller and associated support circuitry software 65, a pseudo-dual-port dynamic memory means in the form of RAM 67, a backplane bus interface means 69, and an inter-integrated circuit ($I^2C$) bus together with an $I^2C$ bus controller and synchronisation circuits 71, a radio frequency (RF) interface means 73 and a transmit and receiving antenna 75, which form the airlink port 76 of the base station.

The communications microcontroller 65 is in the form of an MC 68302 IMP microcontroller which runs at a frequency of 20.48 MHz. As in the case of the backbone controller means, the communication microcontroller and software 65 controls all of the processing functions of the CAI controller means 33, the important functions of which will be described in more detail later. The pseudo-dual-port RAM 67 is used for backplane communications, whereby the RAM is disposed between the microcontroller 65 and the backplane bus interface means 69 to temporarily store data intended to be sent by the microcontroller 65 via the backplane bus, to the backbone controller means 35 or alternatively to receive data from the backbone controller means via the backplane bus to the microcontroller 65 to accommodate the sequencing of the connector to enable communications between the backplane bus and the CAI controller means. Accordingly, the backplane bus interface means 69 interfaces the CAI controller means 33 to the backplane means 31 via the airlink slot 37.

The $I^2C$ bus and bus controller 71 allows for communication and control between the microcontroller 65 and the RF interface means 73. The RF interface means 73 essentially comprises a transceiver for alternatively transmitting and receiving RF signals via the antenna 75 in full duplex and accordingly forms the front end of the base station for communicating with any portables disposed within the cell of the base station and in respect of which a CAI is established.

Figure 7:
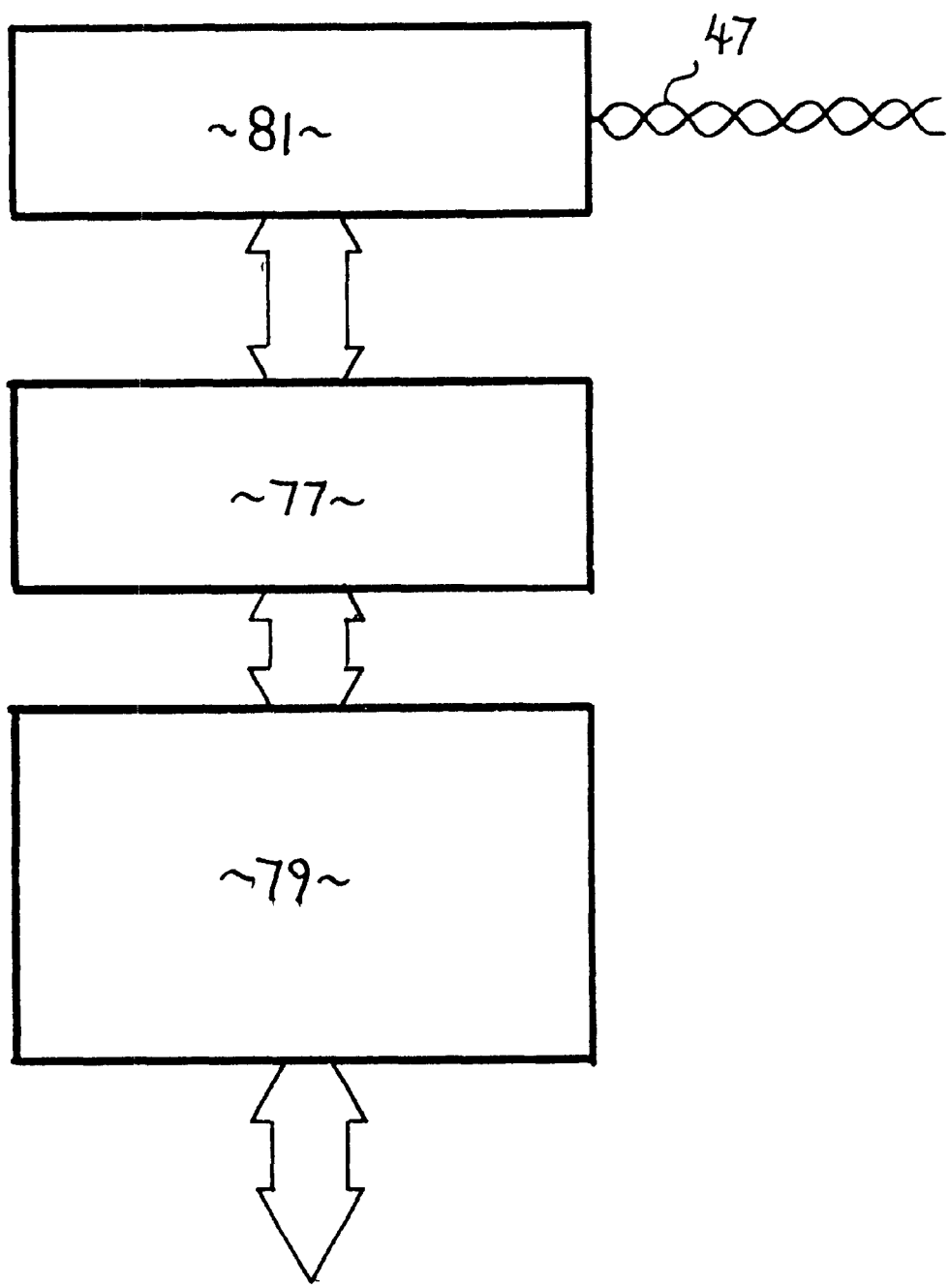
FIG. 7 is a block diagram showing the configuration of a network controller.

The network controller 15 is simply a sophisticated form of base station and in the present embodiment, as shown in FIG. 7 of the drawings, comprises a communications microcontroller with associated software and supporting circuitry 77, a proprietary communication interface for a personal computer 79 and a backbone communications interface means 81.

The microcontroller module 77 is similar to the backbone controller means 35, wherein the microcontroller in the present embodiment is also a Motorola MC68302 IMP communications microcontroller with one serial communications channel (SCC), and runs at a frequency of 20.48 MHz. This module performs the main control and processing functions for the network backbone, and in this respect, functions in a similar manner to the slave base stations insofar as communication control is concerned. The backbone communications interface means 81 comprises a single backbone port to which the common communication medium in the form of the twisted wire pair 47 is directly connected. Accordingly, the backbone communications interface 81 functions in a similar manner to the backbone communications interface 63 of the backbone control means 35 for transmitting and receiving communications traffic along the network backbone.

The network controller 15 differs from the normal slave base station 13, by the provision of the proprietary communication interface 79 which enables it to be connected to a personal microcomputer (PC), in the present embodiment being an IBM-PC or compatible. Consequently, the communication interface 79 in the present embodiment comprises an IBM-PC ISA/PCI/VL-bus interface which includes a plug-and-play capability enabling it to be directly connected to the IBM PC.

The microcomputer PC has application software written in C and runs under Microsoft Windows (™) or Microsoft Windows NT (™). This software allows the network controller 15 to include system control and performance monitoring means to continually monitor the slave base stations and portables throughout the network to provide early maintenance information and relative locations of portables with respect to base stations. The network controller 15 also includes within the communication interface 79, the ability to interface to and communicate with external systems, such as the normal telephone communication network to enable any of the portables to directly connect thereto via the base stations, network backbone and the network controller.

Figure 12:
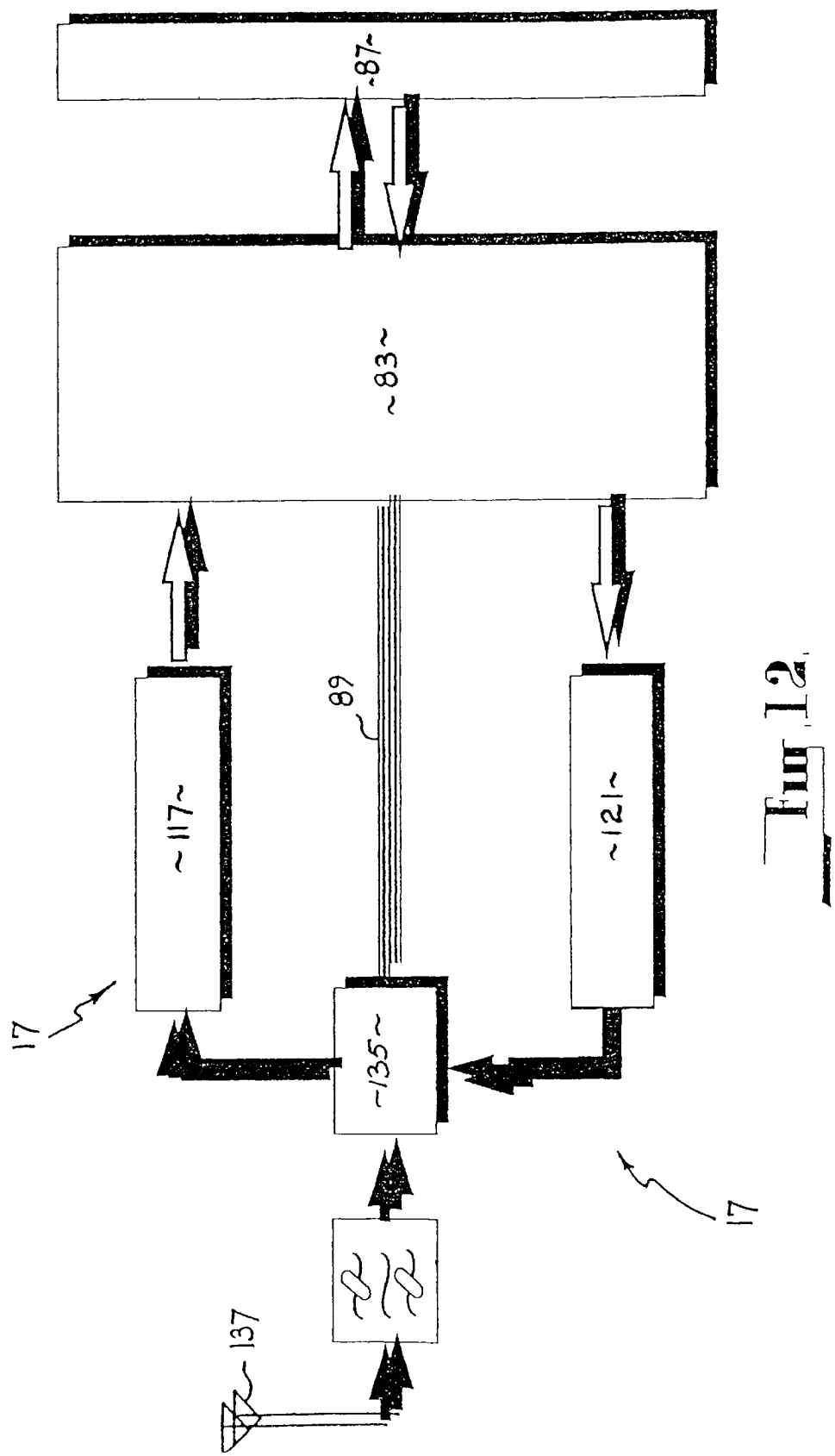
FIG. 12 is a schematic block diagram showing the general configuration of a portable.
Figure 13:
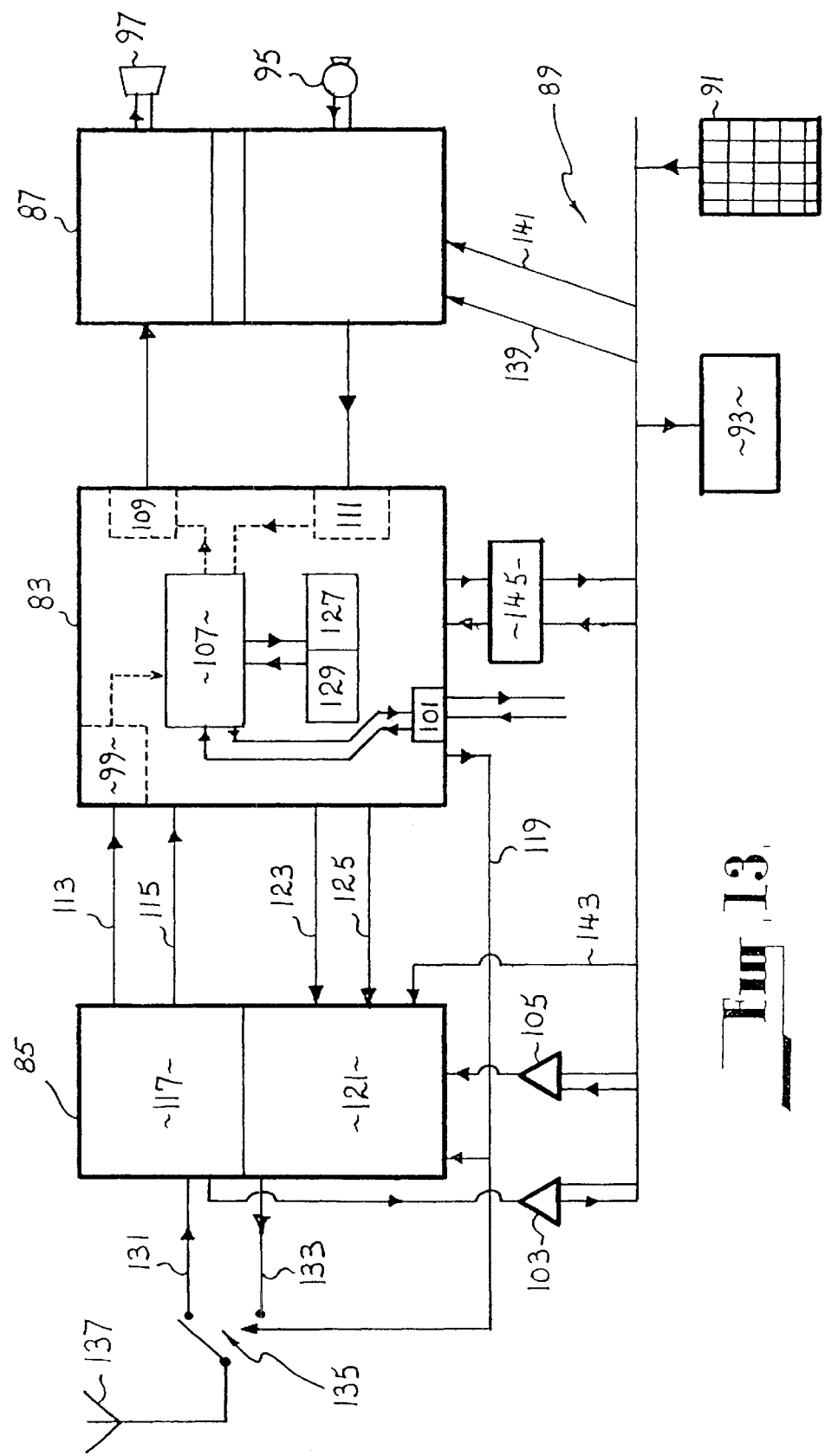
FIG. 13 is a schematic block diagram showing the configuration of a portable in more details.

A portable 17, as shown in FIGS. 12 and 13 of the drawings essentially comprises five modules, namely a microcontroller module 83, a burst mode RF transceiver module 85 comprising a receiver circuit 117 and a transmitter circuit 121, an ADPCM module 87, an $I^2C$ serial bus module 89, peripheral devices and auxiliary control circuits which will be further described. The peripheral devices include a keypad 91, a digital display 93, a microphone 95, and a speaker 97. The auxiliary control circuits include power on resetting means, frame synchronisation and word detection circuits 99, an interface for external data communications in the form of an RS232 interface 101, detecting means in the form of an analog to digital converter (ADC) circuit 103 for detecting received field strength and an output power control in the form of a digital to analog converter (DAC) circuit 105.

The microcontroller module 83 essentially comprises a communications microcontroller in the form of a Motorola MC68302 IMP microcontroller 107 having a plurality of full duplex serial communication channels (SCC), and associated support circuitry. The microcontroller 107 runs at a frequency sufficient to enable it to handle data streams up to the required 512 kb/s and wherein the SCCs have a total maximum data transfer rate of 2 Mb/s.

One SCC is used for the airlink communication of 512 kb/s and another SCC is used for data transmission. The microcontroller 107 has a flexible buffer structure including buffers 109 and 111, which allows for easy encapsulation and dismantling of the data packets being transmitted and received according to the CAI protocol 21. The frame synchronisation word detection circuit works in conjunction with the microcontroller 107 to generate a control pulse to the microcontroller to initiate the filling of buffers 109 and 111 upon detection of a correct synchronisation word. This is determined from recovered data and clock signals received by the receiver circuit 117 of the transceiver 85 and which are output via a recovered data line 113 and a recovered clock line 115, respectively from the receiver circuit 117 for input to the microcontroller module 83. The microcontroller 107 is also required to generate a 1 millisecond timing signal every 12 milliseconds for enabling the transmit and receive modes in the transceiver 85, using its own internal timers via a transmit/receive timing line 119. Consequently, the microcontroller 107 generates data and clock signals via a data line 123 and a clock line 125 respectively, to the transceiver 85 for transmitting by the transmitter circuit 121 for the purposes of communicating with a base station. The microcontroller 107 also provides four programmable chip selects which are used to access external ROM 127 and non-volatile flash RAM 129, portable identity latches (not shown) and auxiliary external control circuit via the I²C bus 89. These chip selects are handled by the initialisation code for the microcontroller when the portable is first switched on. The software required for carrying the various functions of the microcontroller is entered into the external non-volatile flash RAM 129 via the RS232 interface port 101. The burst mode RF transceiver module 85 receives data from a base station via a receive line 131 and transmits data to a base station via a transmit line 133 over the CAI using a receive/transmit switch 135 and antenna 137. Data is received in 1 millisecond bursts at 512 kb/s every 12 milliseconds. The received data is sent to the microcontroller module 83 via the recovered data and recovered clock lines 113 and 115 respectively for decoding and processing according to the CAI protocol. For voice transmission, the information bits at 512 kb/s contained in the data field of the CAI protocol 21 are expanded in time by the microcontroller 107 to form a 32 kb/s bit stream and are routed to the ADPCM module 87 for reproducing the analog voice which is output to the loudspeaker 97.

For the transmit mode, input analog voice via the microphone 95 is encoded into a 32 kb/s bit stream by the ADPCM module 87. This 32 kb/s bit stream is then time compressed into a 512 kb/s bit stream by the microcontroller 107 which processes these information bits together with other control and signalling signals into the appropriate fields of the CAI base frame structure. The resulting 1 millisecond burst at 512 kb/s is then used as the input of a filtered FSK modulator provided in the transmitter 121 of the transceiver 85 to be transmitted over to the base station with which the CAI is established once every 12 milliseconds. The timing for the receive and transmit of the burst mode RF transceiver is generated by the internal timers of the microcontroller module 83 based on its own crystal controlled master clock.

The ADPCM module 87 is provided to encode the input analog signal into a 32 kb/s bit stream and to decode the 32 kb/s ADPCM encoded digitised voice signals into an analog output signal. It is also used to generate various tones needed to indicate "ringing", "engaged" and "dial" status of the portable when used for voice communications. The control signals for these status indications are sent by the microcontroller 107 via the I²C serial bus 89. The 32 kb/s ADPCM encoded/decoded data streams are transferred to and from the microcontroller 107 via one of its full duplex serial communication channels. The required loudness of the loudspeaker 97 and the sensitivity of the microphone 95 can be individually controlled by the keypad 91 via the I²C bus 89 and the signal lines 139 and 141 respectively.

The I²C serial bus 89 is provided as an integral part in the control of the portable's peripherals. The I²C bus allows communication and control between the microcontroller module 83 and the various integrated circuits and peripheral devices such as the keypad 91 and the digital display 93. In the portable 17, the I²C bus 89 controls the frequencies of the transmit and receive frequency synthesiser of the RF transceiver 85 via the control line 143. It also reports the signal strength received via the antenna 137 to the microcontroller 107 via the use of the ADC 103 and enables the microcontroller 107 to control the transmit power of the transmitter circuit 121 via the DAC 105. It also reads the keypad 91 and sends information for display on the digital display 93.

The I²C bus 89 also includes an I²C bus controller 145 which is connected to the microcontroller module 83 via an 8 bit parallel data bus. This bus can be controlled by the microcontroller using interrupt and polling techniques. The interrupt is used for timing critical tasks which normally occur at regular predictable intervals, whilst polling is used for less time critical tasks, which normally occur more randomly.

The auxiliary control circuits include various external circuits to the microcontroller 107 and are generally included in the microcontroller module 83. The auxiliary control circuits perform a variety of auxiliary functions such as power on reset, frame synchronisation and word detection, external data communications and connection to one of the SCCs of the microcontroller 107, ADC and DAC for detection of received field strength and output power control as previously described.

It should be noted that the present embodiment shows a portable 17 with an input interface for both voice, via the ADPCM module 87, and data, via the RS232 interface 101. Accordingly, the portable can be modified for the purposes of voice specific applications and data specific applications. Moreover, in the case of a voice specific application, the portable would exclude the RS232 interface 101 and for a data specific application the portable would exclude the ADPCM module 87.

Now considering some of the important functions performed by the communications microcontroller and software 57 of the backbone controller means 35, which functions take the form of sub-routines invoked during the operation of the backbone controller means, there is provided initialisation and startup means for the purposes of initialising and starting up the network and base stations therein when the base station is the network controller 15 or assumes the role of a pseudo network controller or master.

Moreover, in the case of the base station being the network controller or master, an initialisation sub-routine is invoked which involves:

The base station being powered up

The base station initialising its own sub-system

Each of the base station slaves connected to the master initialising their own sub-systems on being supplied power from the master The master sequentially writing to the remaining backplane slot numbers The slaves concurrently entering an idle state during this time, and waiting to be addressed by the master, the slaves using their own slot numbers to help identify data flow direction The master writing to the appropriate backplane slot to address the first slave base station in the network and then reading the next slot, waiting for an acknowledgment from that slave, whereby the acknowledgment causes the master to make a record of the backplane slot number and repeat the procedure for the next higher slot number so as to write to the next slave base station.

Any failure to acknowledge causes the procedure to fail and the base station moves into the startup phase.

Upon completing the initialisation phase, a startup sub-routine is then invoked by each base station in the network which follows the following procedure:

The base station initially uses its internal clock for all synchronising operations and transmissions The communications microcontroller and software 65 of the CAI controller means 33 is then invoked to monitor the airlink port 76 of the base station for the weakest signal received from a portable. The weakest received signal frequency is then made the operating frequency of the base station, however in the case where there is no receive signal or the receive signal is below a certain threshold, then a default frequency is used as the base station operating frequency.

The communications microcontroller 57 then initially assumes that there is no network controller available and will begin transmitting an alternate "0" "1" bit pattern to establish clock synchronisation. It concurrently monitors the backbone port closest to the network controller for receipt of a signal, and if it detects a signal, it will then assume that it will not be a pseudo network controller or master and will use the recovered clock for its synchronisation.

If the particular base station does not receive any signal on the backbone port closest to the network controller, it then assumes the duties of the network controller, becoming a pseudo network controller, and will continue transmission of the "01" bit pattern for the period of 1 millisecond from the initial start of the transmission of the clock synchronisation sequence, After the 1 millisecond period is up, the master then starts sending the start of the synchronisation frame with the rest of the packet consisting of the "01" bit pattern. Once the start of the frame sequence has begun, slave base stations connected thereto then start listening for messages etc.

Following the startup procedure, a link-up sub-routine is invoked as follows:

Once a base station has determined that it will not be a master, it will enter an idle state, transmitting what it has received through the port closest to the network controller or master. It will also wait for a reset signal from the master.

Once the master has started transmitting the start of a frame, it will transmit a reset signal to the next slave base station, requesting that base station's configuration, ie number of backbone ports, base station address etc.

Upon receipt of the reset signal, the slave base station sets a base station reset flag within its data space and strips the reset information from the current information pack transmitted to that particular base station, retransmitting only the start of the frame and the clock synchronisation sequence to the next slave base station. Further, it transmits the configuration information requested of it during its acknowledgment phase to be received by the master. Thereafter, the base station ignores subsequent transmissions of the reset signal once it has been successfully reset itself and passes the reset signal down the line undisturbed.

Once the master has received the requested information, it makes a note and stores the information in its network database. It then sends the reset signal once again until this signal is ultimately returned to it via the network signifying that all of the slave base stations in the network have been linked up. Upon receipt of the reset signal it terminates the database entry procedure and begins the functions as required of it, which in the case of it being a pseudo network controller, are of a reduced nature compared with the main network controller.

As noted, each of the slave base stations include detection means within their startup procedure to detect whether the base station has become isolated from the preceding base station in the network backbone. Furthermore, they include distributed switching means to switch the base station to becoming a pseudo network controller for assuming some or all of the functions of the network controller to control subsequent slave base stations in the network backbone in response to the detecting means detecting the isolation from the preceding base station and the main network controller or the master which previously controlled it. Thus, upon assuming the role of a pseudo network controller the base station segments the ring structure and creates its own sub-ring structure controlling the operation of the slaves connected thereto.

It should also be noted that the detection means and distributed switching means performs a different function when the base station detects that it becomes isolated from a subsequent base station in the network backbone, but is still connected with the network controller or pseudo network controller. Accordingly, the detection means detects isolation in response to detecting the absence of communication signal traffic at any of its backbone ports or the loss of clock synchronisation in the backbone network between the backbone ports. In this instance, the sub-routine functions to close the network ring between the base station and the subsequent base station, segmenting the ring on the controller side of the isolation point and communicating the relevant information to the network controller or pseudo network controller to which it is connected. Thus, the base station maintains its normal operation as a slave with the network, controller, maintaining a ring structure, albeit being a segmentation of the original ring structure.

It should be noted that the structure of the base stations is quite flexible, whereby in the event of a break in the common communication medium in the form of the twisted pair 47 connected to a backbone port, the link between adjacent base stations can be re-established via another communication medium such as an airlink, by simply replacing the backbone interface circuit of the port or the port itself with that adapted for an airlink. Accordingly, the base stations may have alternative port means adapted for interfacing with another communication medium to complete the network backbone over that part of the communication medium which was broken, as a temporary measure, until such time as the break has been able to be repaired.

A corollary of this is also the provision of a temporary slave base station which can be transported to the site of the break or to a position where a faulty base station is disposed, whereby the temporary slave base station uses alternative port means to establish an airlink between adjacent base stations either side of the break or the failed base station, re-establishing the network backbone until such time as the break or failed base station is repaired.

It also needs to be noted that the base stations are configured so as to direct communication traffic transmitted at a nominal carrier frequency for the network in one direction only along the network. This simplifies synchronisation of transmitted signals along the network, at the expense of speed. However, with the distributed control of communications throughout the network by virtue of the design of the base stations themselves, the speed factor of the network does not become a prime consideration.

In addition, it should be noted that each of the base stations transmit or retransmit received communication traffic in the one direction along the network using the internal clock of the base station set to the nominal frequency of the network. The reason for this is to mitigate the accumulation of timing jitter which would otherwise arise due to the length of the network.

Having regard to the important functions of the communications microcontroller and software 83 of a portable 17, sub-routines are provided to include switching means which enable a portable to be automatically switched from a CAI with one base station to another CAI with an adjacent base station as the portable roams throughout the area from one cell to another, without interrupting an ongoing call or communication link between the portable and the transceiver of another portable connected to the network. Accordingly, the sub-routine includes detecting means to detect when the relative received field strength signals transmitted over the CAI at a prescribed carrier frequency from a particular base station to which the portable is interfaced, fall below a prescribed threshold. In addition, the sub-routine includes handover means to search for a stronger received field strength of another CAI signal transmitted by another base station at a different carrier frequency in response to the sensing means determining that the received field strength of the base station to which it is currently interfaced is below the prescribed threshold. This handover means further actuates the switching means to switch the portable to the different carrier frequency and to establish a CAI with the other base station. The specific methodology involved with this sub-routine will be described in more detail later.

Now having described the makeup of the components of the network in detail, the method of user log on and channel allocation with respect to the CAI will now be described.

A portable 17 which has its identity registered with the network controller 15 at the outset, is firstly switched on. It will then be set to the receive mode and will scan through all of the carrier frequencies used by the base stations in the network, one at a time, and settle at the carrier which provides the maximum received field strength. Following this it will attempt to log on to the system by first listening to messages transmitted by the base station. When a free timeslot is found, the portable will wait for 5 milliseconds after the end of that particular timeslot before transmitting a "user log on" airlink message to the base station. Upon receipt of this message, the base station returns an acknowledgment message back to the portable, using the same time slot position for the downlink in the next frame. The identification of this portable is then passed on by the base station together with its own identification to the network controller via the network backbone. In this way, the location of a particular portable in the network will be registered with the network controller. This information is used by the network controller for setting up calls as well as providing important information to the underground mine management on the whereabouts of the particular portable.

When a portable wants to initiate a call, it first has to search for a free timeslot with sufficient capacity on the airlink with the base station that is currently logged on. When such a free timeslot is available, the portable will send to the base station at the allocated time a "call setup" message together with its own identification and that of the called party. The base station upon receiving this message will relay this "call setup" request to the network controller via the network backbone. Subsequently, the network controller will redirect this request to the base station that the called party has been logged onto. If sufficient capacity is available on the airlink, the base station will notify the called party. Upon receiving an acknowledgment from the called party, the base station will send a "call go ahead" message back to the original base station of the caller via the network controller. Once the sequence of messages is complete, the call is successfully set up. However, if there is insufficient capacity on the airlink for the called party, the call is denied.

As a precautionary measure for minimising interference to the system, the communications microcontroller 83 of a portable is programmed so that it does not transmit unless it has detected a vacant timeslot. Even then it is first synchronised with the network and transmits at the precise time interval allocated to that particular free timeslot.

Another aspect of both the network and CAI protocols as previously described is the ability to allow portable users to roam throughout the network service area without losing contact with the network. This means that a portable is required to be able to automatically switch or handover from base station to base station without the interference of the user. Furthermore, this handover process needs to be completed as quickly as possible to avoid interrupting an ongoing call. Importantly, in the present embodiment, this handover process is initiated by the portable and not by the base station.

When a portable moves away from the base station to the extremes of its cell, the field strength received by the portable becomes weaker. When this field strength falls below the preset threshold value, the portable will attempt to initiate the handover process in the following sequence. Moreover, the portable will first search for a stronger carrier presumably from an adjacent base station. It then will switch over to this new carrier and proceed to search for free airlink capacity in the new base station. If this is successful, a handover message will then be sent by the portable to the new base station.

The handover process is complex and relates to the status of the portable performing the handover, whereby the portable could either be onhook, ie inactive, offhook, ie active, and the call not yet initiated, or offhook (active) with the call in progress. Each of these three situations requires a slightly different handover approach.

The most straightforward scenario is when the status of the portable is inactive. In this case the new base station will send a signalling message to the network controller, and add the identification of the portable to its local user list. The portable will also receive an acknowledgment that the handover is successful. When the network controller receives the message from the new base station, it recognises a handover has occurred and proceeds to update the location of the portable. This new location is broadcast to all base stations. When the original base station receives this new location message, it will delete that particular portable from its local user list.

In the case where the status of the portable is offhook, but the call is not yet initiated, the scenario is slightly more complicated. In this case, the base station will set up a new airlink call entry for the portable and attempt to allocate the required airlink channels. The new base station then sets up a signalling message to be sent to the network controller via the backbone and adds the portable station identity to the local user list together with identifying its active status. The original handover message received by the new base station is also acknowledged back to the portable. The network controller takes a similar course of action, whereupon receipt of the signalling message from the new base station, it recognises that the handover has occurred and proceeds to update the location of the portable at the new base station. This new location is again broadcast by the network controller to all base stations. Upon receipt of this new location message from the network controller, the new base station takes no action, simply carrying on with maintaining the required airlink channel for the portable. On the other hand, when the old base station receives the acknowledgment message from the network controller, it will check the associated airlink call entry it previously had for the portable and once found, removes the entry and changes the airlink channel from allocated to deallocated status, making it available for other communications. When the portable station receives the acknowledgment from the network controller itself, the handover is completed.

In the case when the status of the portable is offhook with a call in progress, the scenario is far more complicated. In this case, the portable station is involved in a call with another portable station, and three different scenarios can occur. Firstly, the call between the portable stations can be an intercell call before the handover and remain an intercell call after the handover. Secondly, the call between the two portable stations could be an intercell call before the handover and become an intracell call after the handover. Finally, the call between the two portable stations can be an intracell call before the handover and became an intercell call after the handover.

Essentially, the procedure is the same for each of these scenarios, with the main difference residing with the messages exchanged between the network controller and the new and old base stations. However, in the case when there are no, or insufficient, time slots available in the new base station for the handover to proceed, the portable will remain with the old base station for as long as possible. If it fails to achieve handover after several attempts at predetermined intervals, the call would then just be terminated because of the poor signal strength.

When the handover is successful, the portable will be allocated the required time slots (or channel) by the new base station, and is added to the local user list with its status remaining at "busy". This new information is then relayed back as a signal message word for the network controller via the network backbone.

At this point, the network controller will respond differently according to the three aforementioned scenarios.

When the network controller receives the message of the handover from the new base station, it recognises a handover has taken place. It then retrieves the backbone call entry associated with the handover portable. When the network controller determines that the address of the new base station and that of the destination base station (ie the base station associated with the called portable) are not the same, then the call status remains an intercell call. A handover call message is then sent by the network controller to the new base station providing the identity of the destination base station and portable station. This is followed by the broadcast of a handover message of the particular portable station to all the base stations. When this message is received by the old base station, the backbone call entry associated with the handover portable station is removed, the associated call buffer is freed, the airlink call entry associated with the handover portable station is removed, and the appropriate airlink channel is deallocated. When this broadcast message reaches the destination portable station, the backbone call entry is updated to reflect the change of the address from the old base station to the new base station.

When the new base station receives the handover control message, the new base station proceeds to create a new backbone call entry which then links to the airlink call entry associated with the handover portable. An acknowledgment is then sent by the new base station to the network controller. Upon receiving the acknowledgment from the new base station, the network controller sends a similar handover message to the destination base station, which will simply acknowledge the reception, since the backbone call entry associated with the destination portable already exists. When this acknowledgment is received the network controller will update the appropriate network statistics in the status window. If either the new base station or destination base station fails to acknowledge the network controller after a predetermined number of retries, the network controller will initiate the call termination process.

In the case of the call being an intercell call before handover and an intracell call after handover, the new base station and destination base station are one and the same. The handover function at the new base station will link the airlink call entries associated with the handover portable and destination portable together. The backbone call entry associated with the destination portable is retrieved from the backbone registration queue. The associated call buffer is freed up and the backbone call removed.

The new base station then sends a handover signalling message to the network controller which recognises a handover has occurred. The network controller then removes the backbone call entry and deallocates the backbone channel associated with the handover portable. This is followed by a broadcast acknowledgment to all the base stations.

When the new base station receives the broadcast acknowledgment, it takes no further action, and the handover is considered complete. When the old base station receives the broadcast, it removes the airlink and backbone call entries which were associated with the handover portable. These channels are reallocated and the handover portable is removed from the old base station's user list.

In the final case where the call was an intracell call before and an intercell call after handover, the network controller receives the handover signalling message from the new base station. It recognises a handover has occurred. The network controller then sends a control message to the new base station informing it of the identities of the destination base station and portable. An acknowledgment signalling message is also broadcast to all of the base stations. When the message reaches the old base station (in this case the old base station is also the destination base station) it removes the airlink call entry associated with the handover portable and the appropriate airlink channel is deallocated.

When the new base station receives this acknowledgment message, it proceeds to create a new backbone call entry. It then links this call entry to the airlink call entry associated with the handover portable. A call status message is then sent to the network controller informing it that it is an intercell call. When the network controller receives the status message, it updates its network statistics and the status window.

If either the new or old base station fails to acknowledge the network controller after a predetermined number of retries, the network controller will initiate the call termination process.

It should be noted that the communication network described in this embodiment has many advantages over conventional telecommunication networks. Moreover, in conventional telecommunication networks, reliability is normally assured by providing several transmission paths for signal re-routing, however, this re-routing strategy is not practical for the layout structures for many underground mines. For improved network reliability in the present embodiment, the base stations may be served by two separate transceivers operating in a space-diversity mode which improves bit error rate performance in multi-mode transmission. In this case, if a transceiver in a base station malfunctions, the network continues albeit a drop in transmission quality. Self diagnostics are extensively used in the remote base stations to further improve reliability and greatly simplify the maintenance of the network.

It should also be appreciated that the present network is sufficiently flexible to enable many functions, such as selective calling, message broadcasting, priority setting, radio paging, remote telemetry and the like to be modified and others added as required through software programming at the network controller. From the network controller, the underground mine communication system can be interfaced with other networks including the public telephone network.

Importantly, it should be appreciated that the present network overcomes propagation losses in tunnels (experienced in the prior art by use of leaky coaxial cable and the like) by establishing an appropriate mine wide communication network infrastructure. Furthermore, the described embodiment overcomes propagation losses along the communication path and around corners and crossings in an underground mine by the division of the radio coverage area of the mine into small zones or cells similar to the cellular telephone concept. Thus, each cell is served by a fixed base station which provides two way UHF radio communications between the network and portable stations.

In addition, unlike other wireless networks proposed for surface application by the base stations of the present embodiment being linked together in the form of a segmentable and extendable ring architecture to custom fit the structural layout of a typical underground mine, the structure allows for the continued expansion of the mining area and simplifies the timing synchronisation of the network backbone which can be implemented using a mixture of different transmission media, as previously described.

Furthermore, distributed switching is employed in each base station and consequently communications can continue within an individual network segment in the event of a faulty communication port or a break in the network backbone, the reliability of the network being further enhanced by the continued monitoring of the various base stations. For example, in the event of a break in the network backbone, the system can automatically reconfigure itself to operate as two individual network segments. The section of the network before the faulty point continues to operate normally with the network controller, and the base station immediately after the faulty point assumes the role of a pseudo network controller or master for the remaining network segment.

Use of the latest digital technology in providing for TDMA and the adoption of digital modulation, allows for several voice and data channels to be time division multiplexed and transmitted using a single carrier. Furthermore, a set of data and voice channels can be flexibly shared among many users, with any channel being assigned to voice or data.

As previously stated, the common air interface is able to support 6×32 kb/s full duplex voice, channels or 48×4 kb/s full duplex data channels or a combination of both data and voice channels. To cater for different applications and data transmission, the data rate can be specifically requested by a user in multiples of 4 kb/s up to a maximum of 192 kb/s. As also discussed previously, the network backbone protocol can support a combination of voice and data channels up to the rate of 1888 kb/s.

It should be appreciated that the scope of the present invention is not limited to the particular embodiment herein described, and certain changes or modifications may be made to the communication network in accordance with standard engineering and design practice without departing from the spirit of the invention. Importantly, the communication network is not limited to application in a mine or other subterranean working environment, and has effective utility and application in any localised open environment such as a department store, or building, or an open-cut mine. as two individual network segments. The section of the network before the faulty point continues to operate normally with the network controller, and the base station immediately after the faulty point assumes the role of a pseudo network controller or master for the remaining network segment.

Use of the latest digital technology in providing for TDMA and the adoption of digital modulation, allows for several voice and data channels to be time division multiplexed and transmitted using a single carrier. Furthermore, a set of data and voice channels can be flexibly shared among many users, with any channel being assigned to voice or data.

As previously stated, the common air interface is able to support 6×32 kb/s full duplex voice channels or 48×4 kb/s full duplex data channels or a combination of both data and voice channels. To cater for different applications and data transmission, the data rate can be specifically requested by a user in multiples of 4 kb/s up to a maximum of 192 kb/s. As also discussed previously, the network backbone protocol can support a combination of voice and data channels up to the rate of 1888 kb/s.

It should be appreciated that the scope of the present invention is not limited to the particular embodiment herein described, and certain changes or modifications may be made to the communication network in accordance with standard engineering and design practice without departing from the spirit of the invention. Importantly, the communication network is not limited to application in a mine or other subterranean working environment, and has effective utility and application in any localised open environment such as a department store, or building, or an open-cut mine.

What is claimed is:

1. A communication network for an area comprising:
   a plurality of base stations interconnected by a unidirectional signal path to form a network backbone, with a base station at one end of the backbone configured to act as a network controller for controlling the network and a base station at a distal end of the backbone configured to loop back the unidirectional signal path to the network controller via any intervening base stations whereby the network controller is not in direct signal connection with the base station at the distal end;
   a plurality of portables adapted for communication with any of said base stations by a common air interface;
   a network protocol for communicating between said base stations, said protocol realized by using a time division multiple access (TDMA) framing specification comprising a plurality of basic frames, each basic frame divided into a plurality of time slots, where a first of said time slots in each basic frame is a signalling time slot that, in turn is divided into a preamble word and a plurality of signalling message words, the preamble word divided into a bit synchronisation word and a framed synchronisation word, to provide a guard band to accommodation for timing tolerances between receive and transmit clock frequencies, and where each signalling message word is associated with a particular base station; and,
   a common air interface protocol for communicating between said portables and said base stations;
   wherein said base stations other than the network controller act as slave stations to said network controller and each slave base station defines a discrete cell within which communication between a portable disposed within that cell and its corresponding base station is performed over said common air interface.

2. A communication network as claimed in claim 1, wherein said network controller includes initialisation and start up means to initialise and startup the network and said base stations therein, and further includes monitoring means to continually monitor said base stations and said portables to provide early maintenance information and locations of said portables.

3. A communication network as claimed in claim 1, wherein some or all of the slave base stations include detection means to detect when said base station becomes isolated from the preceding base station in said network backbone, and distributed switching means to enable said base station to become a pseudo network controller for assuming some or all of the functions of said network controller to control subsequent slave base stations in said network backbone in response to said detecting means detecting the isolation from said preceding base station and said network controller.

4. A communication network as claimed in claim 3, wherein said detection means is further adapted to detect when said base station becomes isolated from a subsequent base station in said network backbone and communicate the occurance of the base station becoming isolated to said network controller, and said distributed switching means is adapted to close the signal path between said base station and said subsequent base station segmenting said signal path, and maintain normal operation with said network controller in response to said detecting means detecting the isolation from said subsequent base station.

5. A communication network as claimed in claim 4, wherein said detection means detects said isolation in response to detecting the absence of communication signal traffic or the loss of clock synchronisation in the backbone network of a communication port of said base station.

6. A communication network as claimed in claim 5, wherein some or all of said base stations have alternative port means adapted for linking with another communication medium to complete said network backbone in the event of said unidirectional signal path being broken between a pair of adjacent base stations or in the event of said base station becoming isolated from an adjacent base station.

7. A communication network as claimed in claim 6, including a temporary slave base station adapted for linking with either said unidirectional signal path or the other communication medium, disposed between said pair of adjacent base stations or proximate to said adjacent base station, and being linked either by said unidirectional signal path or other communication medium to adjacent base stations in order to temporarily complete said network backbone.

8. A communication network as claimed in claim 1 wherein said base station functions as a communication base for any of said portables disposed within said cell of said base station and relays communication signals along said network backbone to other base stations in accordance with said network protocol and said common air interface protocol.

9. A communication network as claimed in claim 1, wherein each of said base stations transmit or retransmit received communication traffic in one direction along the network via said unidirectional signal path using an internal clock set to a nominal frequency of the network so as to mitigate the accumulation of timing jitter.

10. A communication network as claimed in claim 1, wherein said network controller assigns an operating frequency to each said base station for the respective common air interface to said base station each time the network is initialised or restarted.

11. A communication network as claimed in claim 1, wherein said plurality of basic frames are combined to form a superframe, and wherein the time slots other than said first time slot constitute normal time slots, wherein corresponding time slots of said superframe are controlled to constitute discrete channels, selectively chosen such that said signalling time slots communicate control signals and said normal time slots communicate video, voice or data signals.

12. A communication network as claimed in claim 11, wherein said normal time slot comprises a control field and a data field; said control field to be used for conveying information such as message codes, base station and portable addresses and other important control information depending on the backbone network message being transferred; and said data field to be used by said startup means for sending information to each said base station from said network controller during startup, and during intercell calls between said portables.

13. A communication network as claimed in claim 1, wherein each of said time slots is of 1 ms duration and comprises 2048 bits, providing for a transmission rate of 2.048 Mb/s for said network backbone.

14. A communication network as claimed in claim 13, wherein each said basic frame comprises 60 time slots and said superframe comprises eight basic frames, providing for a basic data rate of 4 kb/s and a combined voice and data transmission up to a data rate of 1.888 Mb/s or an equivalent of fifty nine 32 kb/s full duplex voice channels.

15. A communication network as claimed in claim 1, wherein said common air interface protocol is realised using a time division multiple access—time division duplex (TDMA-TDD) framing specification comprising a plurality of basic frames combined to form a superframe, each basic frame consisting of a plurality of time slots, half of said time slots being used for transmission from a said base station to said portables within the cell thereof, and the other half of said time slots being used for transmission from a said portable within said cell to said base station, wherein corresponding time slots of said superframe are controlled to constitute discrete channels, selectively chosen for communicating control signals and any of video, voice or data signals.

16. A communication network as claimed in claim 15, wherein each said time slot comprises a preamble, a control field, a cyclic redundancy check (CRC) field, a data field and a guard band; said preamble providing for bit and frame synchronisation; said control field providing for message type identification, channel association with specific calls, portable station address, message information, call type and channel allocation; said CRC field providing for calculation of a CRC on said control field to protect same: said data field to be used for carrying information during speech or data calls; and said guard band providing a buffer between consecutive channels so that airlink data does not collide and to cater for the timing tolerance between said base station and said portable communicating therewith.

17. A communication network as claimed in claim 16, wherein said time slot is of 1 ms duration and comprises 512 bits, providing for a transmission rate of 512 kb/s for said common air interface.

18. A communication network as claimed in claim 17, wherein each said basic frame comprises twelve time slots, six for downlink transmission and six for uplink transmission, and said superframe comprises eight basic frames, thereby realising six full duplex communication channels using a single carrier frequency, providing for a basic data rate of 4 kb/s and a transmission bit rate in multiples of said basic data rate up to a maximum of 192 kb/s.

19. A base station for a communication network as claimed in claim 1, including one or more backbone controller means for communicating with the network backbone, a common air interface controller means for communicating with any of the portables within the cell of the base station, and a backplane means for controlledly interconnecting said backbone controller means, said common air interface controller means and said network backbone.

20. A base station as claimed in claim 19, wherein said backplane means includes: backplane connectors and bus drivers for physically interconnecting said backbone controller means and said common air interface controller means therewith; a base station address identifier means for setting the address of said base station for the network; a clock driver for sourcing the internal clock of said base station; and base station resetting means for resetting said base station at power-on from the network backbone or manually at said base station.

21. A base station as claimed in claim 19, wherein a said backbone controller means includes: a communications microcontroller and software with associated support and synchronisation circuitry for controlling the operation of said backbone controller means; a pseudo-dual-port dynamic memory means and backplane bus interface means for communicating with said backplane means; a port router or assigner for routing data to an appropriate backbone port for transmission along the network backbone; and backbone communications interface means for each backbone port for connection to the communication media of the network backbone provided to the base station.

22. A base station as claimed in claim 19, wherein said common air interface controller means comprises a communications microcontroller and software for controlling the operation of said common air interface controller means, a pseudo-dual-port dynamic memory means and backplane bus interface means for communicating with said backplane means, a radio frequency (RF) interface means and antenna for communicating with a portable and creating the discrete cell for said base station, and an inter-integrated circuit ($I^2C$) bus, $I^2C$ bus controller and synchronisation circuits for interfacing said communications microcontroller with said RF interface means.

23. A network controller for a communication network as claimed in claim 1, including a communications microcontroller provided with a serial communication channel for operating the network controller and communicating with the network backbone, a microcomputer bus communications interface for connecting said communications microcontroller to a microcomputer, and a backbone communications interface connecting said communications microcontroller to the network backbone.

24. A portable for a communication network as claimed in claim 1, including: a communications microcontroller provided with a plurality of serial communication channels (SCC) for operating the portable and generating timing signals for enabling communication with a base station over the common air interface; a burst mode RF transceiver for receiving data from and transmitting data to a base station over the common air interface under the control of said communications microcontroller; an ADPCM means to encode analog signals input to the ADPCM means for transmitting to a portable into a digitised bit stream for said communications microcontroller to transmit over the common air interface, and in reverse to decode digitised bit streams to be output by the ADPCM means as analog signals received from the common air interface and which are input to said communications microcontroller; peripheral devices; auxiliary control circuits; and an $I^2C$ serial bus and bus controller for allowing communication and control between said communications microcontroller and said peripheral devices and said auxiliary control circuits.

25. A portable as claimed in claim 24, wherein said peripheral devices include a keypad, display, microphone and loudspeaker; and said auxiliary control circuits include power-on resetting means, frame synchronisation word detection, external interface for data transmission, and detecting means for detection of received field strength and output power control using analog to digital converters and digital to analog converters.

26. A communication network according to claim 1 wherein the network backbone includes one or more branches of base stations connected by said unidirectional signal path and extending from any one of said intervening base stations, wherein each base station at a distal end of each branch is configured to loop back the unidirectional signal path to the intervening base station from which that branch extends.

27. A method for communicating along a communication network comprising a plurality of base stations interconnected by a unidirectional signal path to form a network backbone, with a base station at one end of the backbone configured to act as a network controller for controlling the network and a base station at a distal end of the backbone configured to loop back the unidirectional signal path to the network controller via any intervening base stations whereby the network controller is not in direct signal connection with the base station at the distal end;

a plurality of portables adapted for communication with any of said base stations by a common air interface;

a network protocol for communicating between said base stations, said protocol realized by using a time division multiple access (TDMA) framing specification comprising a plurality of basic frames, each basic frame divided into a plurality of time slots, where a first of said time slots in each basic frame is a signalling time slot that, in turn is divided into a preamble word and plurality of signalling message words, the preamble word divided into a bit synchronisation word and a framed synchronisation word, to provide a guard band to accommodation for timing tolerances between receive and transmit clock frequencies, and where each signalling message word is associated with a particular base station; and, a common air interface protocol for communicating between said portables and said base stations;

wherein said base stations other than the network controller act as slave stations to said network controller and each slave base station defines a discrete cell within which communication between a portable disposed within that cell and its corresponding base station is performed over said common air interface, said method including:

initialising the network controller and all of the base stations in the network;

assigning prescribed operating frequencies for each of the slave base stations in sequence; and linking each of the slave base stations into the network backbone to commence inter-base station and intra-base station communications.

28. A method as claimed in claim 27, wherein said initialising includes:

powering up said network controller;

initialising the sub-system of said network controller;

supplying power to each of said base stations connected thereto;

initialising the sub-system of each said base station on receipt of said power;

determining the direction of communications along the network from said network controller;

checking the address and presence of each base station in the network; and recording said address and presence at said network controller.

29. A method as claimed in claim 27, wherein said assigning includes:

synchronising operation and transmission of each base station with their own clocks;

monitoring the weakest signal received from a portable at each said base station; and adopting the frequency of said weakest signal at each base station as the operating frequency for the particular base station, or in the absence of a received signal at a said base station, adopting a default frequency for said operating frequency thereof.

30. A method as claimed in claim 27, wherein said linking includes initially determining whether any of said base stations are to become a pseudo network controller after said assigning; and transmitting a prescribed signal sequence for a prescribed period after the initial transmission of a clock synchronisation sequence from each base station determmined to be a pseudo network controller and from said network controller.

31. A method as claimed in claim 30, wherein said determining includes transmitting a predetermined signal from each base station downstream along the network; concurrently monitoring the receipt of a further predetermined signal at each base station from upstream of the network connected thereto, and assigning the role of a said pseudo network controller to said base stations that do not receive a said further predetermined signal from upstream of the network.

32. A method as claimed in claim 31, including monitoring the receipt of other predetermined signals from downstream of the network connected to said base stations, in addition to said concurrent monitoring, and isolating and closing said network from the downstream side of any said base stations that do not receive said other predetermined signals.

33. A method as claimed in claim 27, wherein said linking includes transmitting a synchronisation signal and a reset signal to successive slave base stations from said network controller or said pseudo network controller, and receiving and retransmitting said synchronisation signal and said reset signal at successive slave base stations along the network until said reset signal is received by a particular slave base station for which it is intended, or until said synchronisation signal and said reset signal is returned to said network controller or said pseudo network controller signifying that all slave base stations in the network have been linked thereto.

34. A method as claimed in claim 33, wherein said linking includes:

stripping said reset signal at a particular slave base station for which said reset signal is intended;

retransmitting only said synchronisation signal from said particular base station signifying that said particular base station has been reset; and receiving and retransmitting subsequent synchronisation signals and reset signals not intended for the reset base station thereafter.

35. A method as claimed in claim 34, wherein said linking includes:

requesting the configuration of each slave base station connected to said network controller via said reset signal;

transmitting the configuration information said particular slave base station in addition to said retransmitting of said synchronisation signal from said particular slave base station; and recording said configuration information at said network controller or said pseudo network controller successively for each reset slave base station on receiving said information along the network until all reset slave base stations have been recorded.

36. A method as claimed in claim 35, including commencing inter-base station and intra-base station communications after the recording of the configuration of all said reset base stations has been completed.

37. A method for establishing a common air interface (CAI) between a portable and a communication network including a plurality of portables and a plurality of base stations interconnected by a unidirectional signal path to form a network backbone, with a base station at one end of the backbone configured to act as a network controller for controlling the network and a base station at a distal end of the backbone configured to loop back the unidirectional signal path to the network controller via any intervening base stations whereby the network controller is not in direct signal connection with the base station at the distal end;

said plurality of portables adapted for communication with any of said base stations by a common air interface;

a network protocol for communicating between said base stations, said protocol realized by using a time division multiple access (TDMA) framing specification comprising a plurality of basic frames, each basic frame divided into a plurality of time slots, where a first of said time slots in each basic frame is a signalling time slot that, in turn is divided into a preamble word and plurality of signalling message words, the preamble word divided into a bit synchronisation word and a framed synchronisation word, to provide a guard band to accommodation for timing tolerances between receive and transmit clock frequencies, and where each signalling message word is associated with a particular base station; and, a common air interface protocol for communicating between said portables and said base stations;

wherein said base stations other than the network controller act as slave stations to said network controller and each slave base station difines a discrete cell within which communication between a portable disposed within that cell and its corresponding base station is performed over said common air interface, said method including:

scanning through all of the carrier frequencies of the base stations connected into the network;

selecting the carrier frequency of a base station having the maximum received field strength;

listening to messages transmitted by said base station at the selected carrier frequency and identifying a free time slot on the airlink with said base station;

transmitting a log-on message to said base station after a prescribed time period from the end of said free time slot;

returning an acknowledgment message from said base station to said portable after a further prescribed time period corresponding to the position of said free time slot; and communicating the identity of said portable from said base station to said network controller via the network backbone.

38. A method for communicating between a portable and another party in a communication network including a plurality of said portables and a plurality of base stations interconnected by a unidirectional signal path to form a network backbone, with a base station at one end of the backbone configured to act as a network controller for controlling the network and a base station at a distal end of the backbone configured to loop back the unidirectional signal path to the network controller via any intervening base stations whereby the network controller is not in direct signal connection with the base station at the distal end;

said plurality of portables adapted for communication with any of said base stations by a common air interface;

a network protocol for communicating between said base stations, said protocol realized by using a time division multiple access (TDMA) framing specification comprising a plurality of basic frames, each basic frame divided into a plurality of time slots, where a first of said time slots in each basic frame is a signalling time slot that, in turn is divided into a preamble word and plurality of signalling message words, the preamble word divided into a bit synchronisation word and a framed synchronisation word, to provide a guard band to accommodation for timing tolerances between receive and transmit clock frequencies, and where each signalling message word is associated with a particular base station; and, a common air interface protocol for communicating between said portables and said base stations;

wherein said base stations other than the network controller act as slave stations to said network controller and each slave base station defines a discrete cell within which communication between a portable disposed within that cell and its corresponding base station is performed over said common air interface, said method including:

establishing a common air interface (CAI) between said portable and a base station at the carrier frequency of said base station;

searching for a free time slot of sufficient capacity on the airlink with said base station for the particular communication;

upon finding said free time slot, sending a communication request message and identity codes of both said portable and said other party from said portable to said base station during said free time slot;

relaying the request to said network controller from said base station via the network backbone;

directing the request from said network controller to the base station of said other party;

selecting a free time slot of sufficient capacity on the airlink of said other party base station for said communication;

notifying said other party of the request, from the base station thereof, if sufficient capacity is available on the airlink of said base station thereof, or if there is not sufficient capacity terminating the communication;

waiting for an acknowledgment from said other party after said notifying;

sending a message of said acknowledgment from said base station of said other party to said base station of said portable via said network controller; and allowing communications to proceed between said portable and said other party.

39. A method for communicating between a portable and a communication network comprising a plurality of portables and a plurality of base stations interconnected by a unidirectional signal path to form a network backbone, with a base station at one end of the backbone configured to act as a network controller for controlling the network and a base station at a distal end of the backbone configured to loop back the unidirectional signal path to the network controller via any intervening base stations whereby the network controller is not in direct signal connection with the base station at the distal end;

said plurality of portables adapted for communication with any of said base stations by a common air interface;

a network protocol for communicating between said base stations, said protocol realized by using a time division multiple access (TDMA) framing specification comprising a plurality of basic frames, each basic frame divided into a plurality of time slots, where a first of said time slots in each basic frame is a signalling time slot that, in turn is divided into a preamble word and plurality of signalling message words, the preamble word divided into a bit synchronisation word and a framed synchronisation word, to provide a guard band to accommodation for timing tolerances between receive and transmit clock frequencies, and where each signalling message word is associated with a particular base station; and, a common air interface protocol for communicating between said portables and said base stations;

wherein said base stations other than the network controller act as slave stations to said network controller and each slave base station defines a discrete cell within which communication between a portable disposed within that cell and its corresponding base station is performed over said common air interface, said method including:

establishing a common air interface (CAI) between a portable and a base station at the carrier frequency of said base station;

continuously monitoring the field strength of signals received by said portable from said base station with which said CAI is established;

searching for a stronger field strength of other base stations at different carrier frequencies with which a CAI is not established, upon said field strength of the established CAI falling below a prescribed threshold; switching said portable to the carrier frequency of a new base station having a CAI with a stronger field strength above said threshold after said searching;

establishing a CAI between said portable and said new base station; and disabling the CAI with the old base station having a field strength below said threshold.

40. A method as claimed in claim 39, wherein said disabling includes:

sending a message to the network controller from said new base station of the new CAI;

updating the change in CAI at said network controller;

broadcasting said change to all base stations from said network controller; and deleting the identity of said portable from the current CAI records of said old base station.

41. A communication network for an area comprising:

a plurality of base stations interconnected by a unidirectional signal path to form a network backbone, with a base station at one end of the backbone configured to act as a network controller for controlling the network and a base station at a distal end of the backbone configured to loop back the unidirectional signal path to the network controller via any intervening base stations whereby the network controller is not in direct signal connection with the base station at the distal end;

a plurality of portables adapted for communication with any of said base stations by a common air interface;

a network protocol for communication between said network controller and said base stations;

a common air interface protocol for communicating between a portable and a base station;

said base stations other than said network controller acting as slave base stations to said network controller and where each slave base station defines a discrete cell within which communication between a portable disposed in that cell and the corresponding base station is performed over said common air interface;

some or all of the slave base stations including detection means to detect when said base station becomes isolated from a preceding base station in the network, and distributed switching means to enable the base station to become a pseudo network controller for assuming some or all of the functions of the network controller to control subsequent slave base stations in the network in response to said detecting means detecting the isolation from said preceding base station and said network controller.

42. A communication network according to claims 41, wherein the network backbone includes one or more branches of base stations connected by said unidirectional signal path and extending from any one of said intervening base stations, wherein each base station at a distal end of each branch is configured to loop back the unidirectional signal path to the intervening base station from which that branch extends.

43. A communication network as claimed in claim 41, wherein said detection means is further adapted to detect when said base station becomes isolated from a subsequent base station in said network backbone and communicate from a subsequent base station in said network backbone and communicate the occurrence of the base station becoming isolated to said network controller, sand said distributed switching means is adapted to close the signal path between said base station and said subsequent base station segmenting said signal path, and maintain normal operation with said network controller in response to said detecting means detecting the isolation from said subsequent base station.

44. A communication network as claimed in claim 41, wherein each of said base stations transmit or retransmit received communication traffic in one direction along the network via said unidirectional signal path using an internal clock set to a nominal frequency of the network so as to mitigate the accumulation of timing jitter.

45. A communication network according to claim 41, wherein said network protocol is realised by using a time division multiple access (TDMA) framing specification comprising a plurality of basic frames, each basic frame divided into a plurality of time slots, where a first of said time slots in each basic frame is a signalling time slot that, in turn is divided into a preamble word and a plurality of signalling message words, the preamble word divided into a bit synchronisation word and a framed synchronisation word, to provide a guard band to accommodation for timing tolerances between receive and transmit clock frequencies, and where each signalling message word is associated with a particular base station.

46. A communication network according to claim 45, wherein said plurality of base frames are combined to form a superframe, and wherein the time slots other than said first time slot constitute normal time slots, wherein corresponding time slots of said superframe are controlled to constitute discrete channels, selectively chosen such that said signalling time slots communicate control signals and said normal time slots communicate video, voice or data signals.

47. A communication network as claimed in claim 41, wherein some or all of said base stations have alternative port means adapted for linking with another communication medium to complete said network backbone in the event of said unidirectional signal path being broken between a pair of adjacent base stations or in the event of said base station becoming isolated from an adjacent base station.

48. A communication network as claimed in claim 46, wherein said normal time slot comprises a control field and a data field; said control field to be used for conveying information such as message codes, base station and portable addresses and other important control information depending on the backbone network message being transferred; and said data field to be used by said startup means for sending information to each said base station from said network controller during startup, and during intercell calls between said portables.

49. A communication network as claimed in claim 46, wherein each said basic frame comprises 60 time slots and said superframe comprises eight basic frames, providing for a basic data rate of 4 kb/s and a combined voice and data transmission up to a data rate of 1.888 Mb/s or an equivalent of fifty nine 32 kb/s full duplex voice channels.

50. A communication network for an area comprising:

- a plurality of base stations interconnected by a unidirectional signal path to form a network backbone, with a base station at one end of the backbone configured to act as a network controller for controlling the network and a base station at a distal end of the backbone configured to loop back the unidirectional signal path to the network controller via any intervening base stations whereby the network controller is not in direct signal connection with the base station at the distal end;
- a plurality of portables adapted for communication with any of said base stations by a common air interface;
- a network protocol for communicating between said network controller and said base stations or between said base stations along said network backbone; and,
- a common air interface protocol for communicating between said portables and said base stations;
- wherein the other base stations act as slaves to the network controller; and wherein each slave base station defines a discreet cell within which communication between said portable disposed within said cell and said base station thereof, is able to be performed over said common air interface.

51. A communication network for an area according to claim 50, wherein the network backbone includes one or more branches of base stations connected by said unidirectional signal path and extending from any one of said intervening base stations, wherein each base station at a distal end of each branch is configured to loop back the unidirectional signal path to said intervening base station from which that branch extends.

* * * * *